(12) United States Patent
Kim et al.

(10) Patent No.: US 12,117,985 B2
(45) Date of Patent: Oct. 15, 2024

(54) HOST, STORAGE SYSTEM INCLUDING THE HOST, AND OPERATING METHOD OF THE HOST

(71) Applicant: Samsung Electronics Co., Ltd., Suwon-si (KR)

(72) Inventors: Jin-Soo Kim, Seoul (KR); Jaehoon Shim, Seoul (KR); Carl Duffy, Seoul (KR)

(73) Assignees: Samsung Electronics Co., Ltd., Gyeonggi-Do (KR); Seoul National University R&DB Foundation, Seoul (KR); Research & Business Foundation Sungkyunkwan University, Gyeonggi-Do (KR)

(*) Notice: Subject to any disclaimer, the term of this patent is extended or adjusted under 35 U.S.C. 154(b) by 24 days.

(21) Appl. No.: 17/879,511

(22) Filed: Aug. 2, 2022

(65) Prior Publication Data

US 2023/0046335 A1 Feb. 16, 2023

(30) Foreign Application Priority Data

Aug. 13, 2021 (KR) .......................... 10-2021-0107625
Apr. 27, 2022 (KR) .......................... 10-2022-0052226

(51) Int. Cl.
*G06F 16/22* (2019.01)
*G06F 16/901* (2019.01)

(52) U.S. Cl.
CPC ...... *G06F 16/2246* (2019.01); *G06F 16/9027* (2019.01)

(58) Field of Classification Search
CPC .... G06F 16/27; G06F 16/2358; G06F 16/275; G06F 16/2246; G06F 16/9027

(Continued)

(56) References Cited

U.S. PATENT DOCUMENTS 5,815,649 A * 9/1998 Utter ................... G06F 11/2064
709/215
8,799,558 B2 8/2014 Lee et al.
(Continued)

FOREIGN PATENT DOCUMENTS

CN 105117415 B 7/2018
CN 109690522 A 4/2019
(Continued)

OTHER PUBLICATIONS

Rodeh, O. et al. "BTRFS: The Linux B-Tree Filesystem." ACM Trans. Storage 9, 3, Article 9 (Aug. 2013), 32 pages.

(Continued)

*Primary Examiner* — Phong H Nguyen
(74) *Attorney, Agent, or Firm* — Harness, Dickey & Pierce, P.L.C.

(57) ABSTRACT

A host, a storage system, and an operating method of the host are provided. The host includes a host memory configured to store a tree structure including a leaf node and an index node, an index management module configured to manage an index based on the tree structure and generate a first log corresponding to the leaf node based on a first update request corresponding to a first key-value entry included in the leaf node, and a device driver configured to generate a first write command corresponding to the first log and transmit the generated first write command to a key-value storage device, so as to store the first log in the key-value storage device. The index management module is configured to generate a first new key-value entry, the first new-key value entry including a first value updated based on the first update request, as the first log.

19 Claims, 19 Drawing Sheets

(58) Field of Classification Search
USPC .............. 707/610, 611, 624, 648, 797, 798
See application file for complete search history.

(56) References Cited

U.S. PATENT DOCUMENTS

| | | | |
|---|---|---|---|
| 9,361,332 | B2 | 6/2016 | Benjamin-Deckert et al. |
| 9,454,550 | B2 | 9/2016 | Choi et al. |
| 10,803,006 | B1 | 10/2020 | Xu et al. |
| 10,891,067 | B2* | 1/2021 | Jain .................... G06F 11/1451 |
| 2008/0126397 | A1* | 5/2008 | Alexander ............ G06F 16/284 |
| | | | 707/999.102 |
| 2009/0198772 | A1* | 8/2009 | Kim ....................... H04L 67/02 |
| | | | 709/203 |
| 2010/0082545 | A1* | 4/2010 | Bhattacharjee ......... H03M 7/30 |
| | | | 707/E17.013 |
| 2015/0120774 | A1 | 4/2015 | Park et al. |
| 2016/0371319 | A1* | 12/2016 | Park .................... G06F 16/2358 |

FOREIGN PATENT DOCUMENTS

| | | |
|---|---|---|
| CN | 110134340 A | 8/2019 |
| KR | 101341507 B1 | 12/2013 |
| KR | 101377923 B1 | 3/2014 |
| KR | 101425817 B1 | 8/2014 |
| KR | 101438667 B1 | 9/2014 |
| KR | 101699779 B1 | 1/2017 |

OTHER PUBLICATIONS

Kim, B. and Lee, D.H. "LSB-Tree: a log-structured B-Tree index structure for NAND flash SSDs." *Design Automation for Embedded Systems* 19 (2015): pp. 77-100.

Ahn, J.S. et al. "Jungle: towards dynamically adjustable key-value store by combining LSM-tree and copy-on-write B$^+$-tree." HotStorage '19: Proceedings of the 11th USENIX Conference on Hot Topics in Storage and File Systems (Jul. 2019).

Rodeh, O. "B-trees, Shadowing, and Clones." *ACM Trans.* Stor. 3, 4, Article 15 (Feb. 2008): pp. 15:1-15:27.

Shim, J.H. "LB2-Tree: A Index Structure Specialized for Key-Value SSDs." Master's Thesis, Seoul National University (2021).

* cited by examiner

Algorithm 1 OAK-Tree Insert Process

---

1: procedure OAK-TREE INSERT(*tree_root, K, V*)
2:     *leaf* ← find corresponding leaf node(*K, tree_root*)
3:     if *leaf* not in memory then
4:         *leaf.nr_entries*++
5:         if *leaf.nr_entries* < $T_{Split}$ then
6:             log(*leaf, K, V*)
7:             return
8:         /* Load the leaf node into memory.
9:         This will update *leaf.nr_entries* accordingly */
10:        *leaf* ← load node(*tree_root, leaf*)
11:     if *K* not in *leaf* then
12:         *leaf.nr_entries*++
13:     if *leaf.nr_entries* ≥ $T_{Split}$ then
14:         split(*leaf*)
15:     update(*leaf, K, V*)
16:     log(*leaf, K, V*)

FIG. 11

Algorithm 2 OAK-tree Read Process

1: procedure OAK-TREE READ(*tree_root*, *K*, *V*)
2:     *nodes* ← empty set of nodes
3:     *i* = height
4:     *nodes*[*i*].*address* = tree_root.address
5:     while true do
6:         if *nodes*[*i*] *not in memory* then
7:             *nodes*[*i*] = collect_logs(*nodes*[*i*].*address*)
8:         if *no logs exist* then
9:             return
10:        if *i* > 0 then
11:            /* Index node. */
12:            *nodes*[*i* − 1].*address* = find_lower_node(*K*)
13:        else
14:            /* Leaf node. */
15:            if *K* in *nodes*[*i*] then
16:                *Copy value to V*
17:                return *success*
18:            else
19:                return *failure*
20:        *i* = *i* − 1

HOST, STORAGE SYSTEM INCLUDING THE HOST, AND OPERATING METHOD OF THE HOST

CROSS-REFERENCE TO RELATED APPLICATIONS

This application is based on and claims priority under 35 U.S.C. § 119 to Korean Patent Application Nos. 10-2021-0107625, filed on Aug. 13, 2021 and 10-2022-0052226, filed on Apr. 27, 2022, in the Korean Intellectual Property Office, the disclosures of which are incorporated by reference herein in their entireties.

BACKGROUND

The inventive concepts relate to a storage device, and more particularly, to a host communicating with a storage device, a storage system including the storage device and the host, and an operating method of the host.

Storage devices may be categorized into object-based storage devices and block-based storage devices on the basis of a unit of managing data. Object-based storage devices have a storage structure which stores and manages data in an object form. An object may be data capable of having an arbitrary size, and for example, may denote a file and multimedia data such as a video and an image. Object-based storage devices may be used for managing objects. Object-based storage devices include, for example, key-value storage devices.

SUMMARY

The inventive concepts provide a host, a storage system including the host, and an operating method of the host, which may decrease an input/output throughput between the host and a key-value storage device.

According to an example embodiments of the inventive concepts, there is provided a host communicating with a key-value storage device, the host including a host memory configured to store a tree structure including a leaf node and an index node including routing information about the leaf node, an index management module configured to manage an index based on the tree structure and generate a first log corresponding to the leaf node based on a first update request, the first update request corresponding to a first key-value entry included in the leaf node, and a device driver configured to generate a first write command, the first write command corresponding to the first log and transmit the generated first write command to the key-value storage device, so as to store the first log in the key-value storage device, wherein the index management module is configured to generate a first new key-value entry, the first new key-value entry including a first value updated based on the first update request, as the first log of the first new key-value entry.

According to another example embodiments of the inventive concepts, there is provided a storage system including a host and a key-value storage device configured to communicate with the host, wherein the host includes an index management module configured to manage an index based on a tree structure including a leaf node and an index node and generate a log corresponding to the leaf node based on an update request, the update request corresponding to a first key-value entry included in the leaf node or an insertion request for a second key-value entry, the second key-value entry corresponding to the leaf node and a device driver configured to generate a write command corresponding to the log and transmit the generated write command to the key-value storage device so as to store the log in the key-value storage device, and the key-value storage device is configured to store the log in response to the write command.

According to another example embodiments of the inventive concepts, there is provided an operating method of a host configured to manage an index based on a tree structure including a leaf node and an index node, the operating method including generating a first log based on a first update request corresponding to a first key-value entry included in the leaf node, the first log corresponding to the leaf node, generating a first write command corresponding to the first log, and transmitting the generated first write command to the key-value storage device so as to store the first log in a key-value storage device, wherein the generating the first log includes generating a first new key-value entry, the first new key-value entry including a first value updated based on the first update request as the first log.

BRIEF DESCRIPTION OF THE DRAWINGS

Example embodiments of the inventive concepts will be more clearly understood from the following detailed description taken in conjunction with the accompanying drawings in which:

FIG. 8 illustrates an insertion operation algorithm according to some example embodiments;

FIG. 11 illustrates a read operation algorithm according to some example embodiments;

DETAILED DESCRIPTION OF EXAMPLE EMBODIMENTS

Hereinafter, example embodiments will be described in detail with reference to the accompanying drawings.

Figure 1:
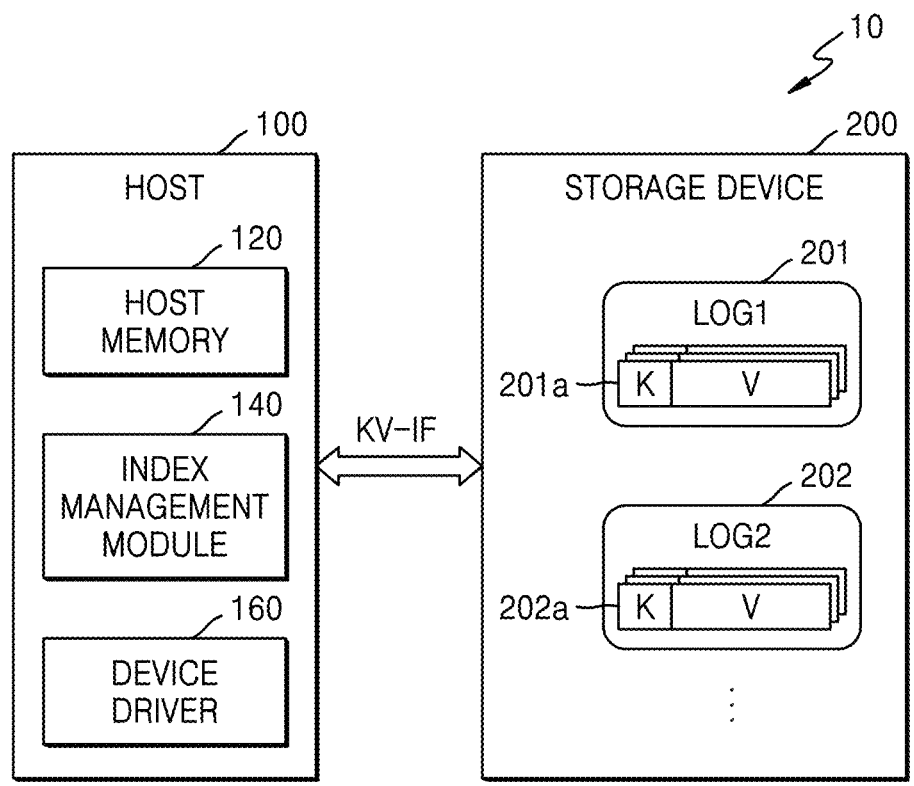
FIG. 1 is a block diagram illustrating a storage system according to some example embodiments.

FIG. 1 is a block diagram illustrating a storage system 10 according to some example embodiments.

Referring to FIG. 1, the storage system 10 may include a host 100 and a storage device 200, and thus, the storage system 10 may be referred to as a host-storage system. In some example embodiments, the storage device 200 may store and manage data in an object form including a key K and a value V. Hereinafter, the storage device 200 may be referred to as a key-value storage device 200. For example, the storage device 200 may correspond to a key-value solid stage drive (SSD).

The host 100 and the key-value storage device 200 may communicate with each other through a key-value interface KV-IF. In detail, based on the key-value KV-IF, the host 100 may provide the key-value storage device 200 with a key-value command corresponding to a key-value operation, a command corresponding to a key, or a key-value object. Also, the key-value storage device 200 may provide the host 100 with a key-value object or a response including a key.

The host 100 may include a host memory 120, an index management module 140, and a device driver 160. The host memory 120 may store a tree structure including a leaf node and an index node, and in some example embodiments, the index node may include routing information about the leaf node. The index management module 140 may manage an index on the basis of the tree structure and may generate at least one log corresponding to the index node or the leaf node. The device driver 160 may generate a write command corresponding to the at least one log so as to store the at least one log in the key-value storage device 200 and may transmit the generated write command to the key-value storage device 200. Also, the device driver 160 may generate an iterator command or a read command corresponding to the at least one log so as to read the at least one log from the key-value storage device 200 and may transmit the iterator command or the read command to the key-value storage device 200.

In some example embodiments, the index management module 140 may generate at least one log corresponding to the lead node on the basis of an update request, an insertion request, and a deletion request for the leaf node. In some example embodiments, the index management module 140 may generate at least one log so that a key of at least one log includes an identification (ID) of a corresponding leaf node. In some example embodiments, the index management module 140 may generate an iterator operation or a read operation on the basis of a read request for the leaf node. A detailed operation of the index management module 140 will be described below with reference to FIG. 3.

The key-value storage device 200 may store at least one log corresponding to the leaf node in response to the write command. In some example embodiments, a key of the at least one log may include an ID of a corresponding leaf node. For example, the at least one log may include a first log 201 and a second log 202. For example, the first log 201 may include a plurality of key-value entries 201a, and the second log 202 may include a plurality of key-value entries 202a. Also, the key-value storage device 200 may provide the at least one log to the host 100 in response to the iterator command or the read command.

Figure 2:
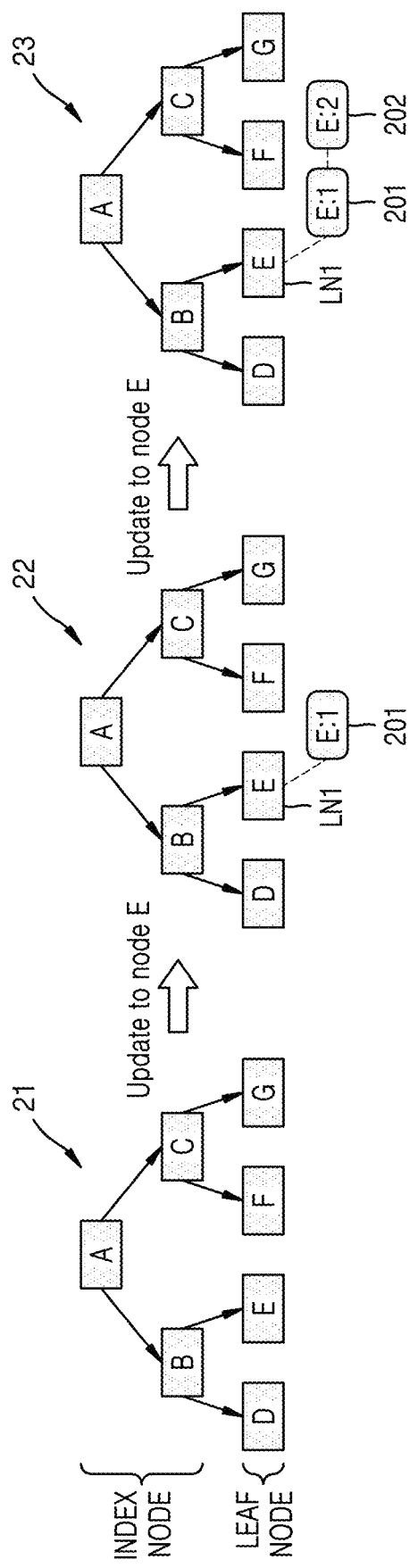
FIG. 2 illustrates a tree structure according to example embodiments.

FIG. 2 illustrates tree structures 21, 22, and 23 according to some example embodiments. Hereinafter, a detailed operation of the storage system 10 will be described with reference to FIGS. 1 and 2.

The host memory 120 may store a first tree structure 21. The first tree structure 21 may include an index set providing a path for finding a leaf node and a sequence set where leaf nodes are sequentially sorted. The index set may include index nodes illustrated by A, B, and C, and in some example embodiments, A, B, and C may each be an identification (e.g., an ID) of each index node. Here, the index node A may be referred to as a root node. The index nodes may include pointer values indicating a child node and key values. The sequence set may include index nodes illustrated by D, E, F, and G, and in some example embodiments, D, E, F, and G may each be an identification (e.g., an ID) of each index node. Each of the leaf nodes may include at least one entry. In some example embodiments, an entry may be referred to as a key-value entry, and the key-value entry may be a key-value pair including a key and a value.

Figure 3:
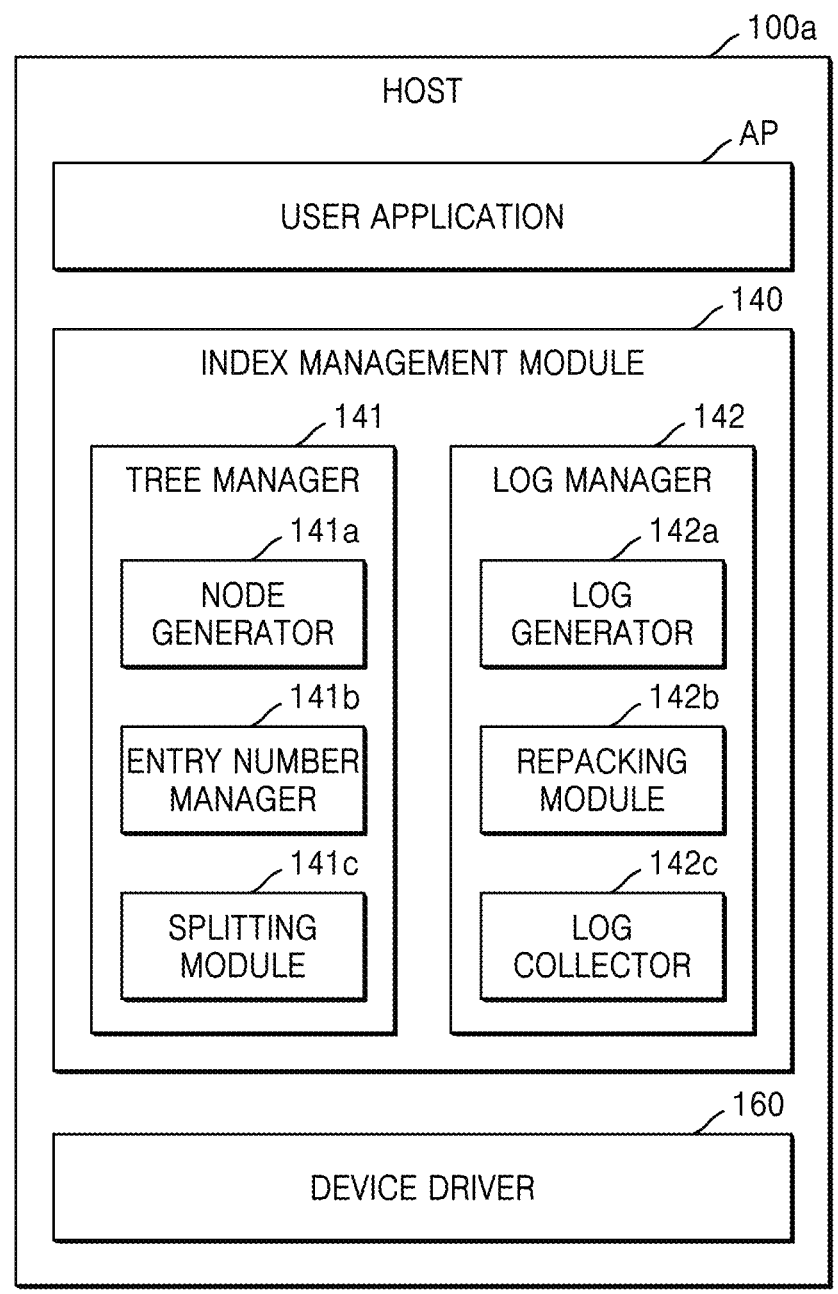
FIG. 3 is a block diagram illustrating in detail a host according to some example embodiments.

For example, the index management module 140 may update the first tree structure 21 to a second tree structure 22 on the basis of a first user request received through a user application (for example, AP of FIG. 3). In detail, the index management module 140 may generate a first log 201 corresponding to a first leaf node LN1 on the basis of the first user request corresponding to the first leaf node LN1 which is one of leaf nodes. In some example embodiments, the index management module 140 may generate the first log 201 as E:1 so that a key of the first log 201 includes E which is an ID of the first leaf node LN1.

The device driver 160 may generate a first write command corresponding to the first log 201 so as to store the first log 201 in the key-value storage device 200 and may transmit the generated first write command in the key-value storage device 200 on the basis of the key-value interface KV-IF. The key-value storage device 200 may store the first log 201 in response to the first write command. For example, the first log 201 may include a plurality of key-value entries 201a. For example, a key of each of the plurality of key-value entries 201a may include E which is an ID of the first leaf node LN1.

For example, the index management module 140 may update the second tree structure 22 to a third tree structure 23 on the basis of a second user request received through a user application (for example, AP of FIG. 3). In detail, the index management module 140 may generate a second log 202 corresponding to the first leaf node LN1 on the basis of the second user request corresponding to the first leaf node LN1 which is one of leaf nodes. In some example embodiments, the index management module 140 may generate the second log 202 as E:2 so that a key of the second log 202 includes E which is the ID of the first leaf node LN1.

The device driver 160 may generate a second write command corresponding to the second log 202 so as to store the second log 202 in the key-value storage device 200 and may transmit the generated second write command in the key-value storage device 200 on the basis of the key-value interface KV-IF. The key-value storage device 200 may store the second log 202 in response to the second write command. For example, the second log 202 may include a plurality of key-value entries 202a. For example, a key of each of the plurality of key-value entries 202a may include E which is the ID of the first leaf node LN1.

Each node configuring a B+ tree may be configured to have a size of a block unit (for example, 4 KB, 16 KB, etc.), and thus, a write operation and a read operation on each node may be performed by block units. Therefore, even when a very small amount of data is updated, an update equal to a block size configuring a corresponding node may be needed. Therefore, because a read-modify-write operation on a node is needed, an undesired input/output operation may be performed between a host and a storage device. Furthermore, in an append-only B+ tree which is a kind of B+ tree, because a new leaf node is allocated in case of every update request, an arithmetic operation on an upper node indicating the allocated leaf node may be added. As a result, a serial upper node update may be performed up to a root node, and such a serial rewrite operation may cause an undesired write operation, causing a reduction in performance and lifetime of a storage device.

According to some example embodiments, by using the key-value storage device 200 instead of a block storage device, only content of data to be written in the first leaf node LN1 may be stored as the first log 201 or the second log 202, corresponding to the first leaf node LN1, in the key-value storage device 200. In some example embodiments, because the first log 201 or the second log 202 need not have a size of a block unit, in some example embodiments where data is updated, an update equal to a block size configuring a node may not be needed. Also, according to some example embodiments, in example embodiments where data is updated, because the first or second log 201 or 202 corresponding to the first leaf node LN1 is stored in the key-value storage device 200, allocation of a new leaf node to the first tree structure 21 may not be needed, and thus, an update of an upper node may not be needed.

As described above, according to some example embodiments, rewriting of an upper node may be delayed, and thus, input/output efficiency between the host 100 and the key-value storage device 200 may be enhanced. Also, according to some example embodiments, because a key of the first or second log 201 or 202 includes an ID (for example, E) of a corresponding first leaf node LN1, the host 100 may not manage a separate log mapping table, and thus, resources used to manage the log mapping table may be reduced.

FIG. 3 is a block diagram illustrating in detail a host 100a according to some example embodiments.

Referring to FIG. 3, the host 100 a may include a user application or an application AP, an index management module 140, and a device driver 160. The elements may each be implemented as software executed by a host controller (for example, 110 of FIG. 4). However, the elements are not limited to software or hardware and may be configured to be stored in a storage medium capable of addressing or may be configured to be executed on one or more processors. Functions provided in the elements may be implemented by subdivided elements or may be implemented by one element which corresponds to a combination of a plurality of elements and performs a certain function.

In FIG. 3, one application AP is illustrated, but the inventive concepts are not limited thereto. According to some example embodiments, the host 100 may execute various applications, and the kind of an application executed by the host 100 may be determined by a user input. For example, the application AP may include a multimedia reproduction application, an image recognition application, a voice recognition application, an encryption application, and a search application. The device driver 160 may control an interface between hardware and a user application AP (or an operating system). The device driver 160 may include a program needed for normally operating hardware in a certain operating system.

The index management module 140 may manage an index on the basis of a tree structure. In some example embodiments, the index management module 140 may include a tree manager 141 and a log manager 142. The tree manager 141 may manage a tree structure including a leaf node and an index node, and in detail, may configure the tree structure. For example, the tree manager 141 may include a node generator 141a, an entry number manager 141b, and a splitting module 141c. The log manager 142 may generate a log corresponding to a leaf node on the basis of a request for the leaf node and may manage the number of logs so that the number of generated logs is not more than a maximum log number. For example, the log manager 142 may include a log generator 142a, a repacking module 142b, and a log collector 142c. Hereinafter, operations of the elements of the index management module 140 will be described with reference to FIGS. 1 to 3.

The node generator 141a may generate index nodes illustrated by A, B, and C and leaf nodes illustrated by D, E, F, and G. In some example embodiments, in example embodiments where the node generator 141a configures the first tree structure 21, the node generator 141a may logically generate index nodes and leaf nodes, and thus, may store the index nodes and the leaf nodes in the host memory 120 and may not store the index nodes and the leaf nodes in the key-value storage device 200. As described above, the key-value storage device 200 may store only logs, but the inventive concepts are not limited thereto and the key-value storage device 200 may store the first tree structure 21 including index nodes and leaf nodes.

In some example embodiments, in example embodiments which generates the first tree structure 21, the node generator 141a may generate index nodes illustrated by A, B, and C and leaf nodes illustrated by D, E, F, and G and may store the generated index nodes and leaf nodes in the host memory 120 and the key-value storage device 200. At this time, in order to store the index nodes and the leaf nodes in the key-value storage device 200, the device driver 160 may generate a write command and may transmit the generated write command to the key-value storage device 200.

The entry number manager 141b may manage the number of entries for each node. In other words, the entry number manager 141b may count the number of key-value entries included in each node and may store the counted number of key-value entries as entry number information. In detail, the entry number manager 141b may manage the number of entries of each of index nodes. Also, the entry number manager 141b may manage the number of entries of each leaf node.

The splitting module 141c may perform a split operation on a node where the number of entries is more than a predetermined or alternatively, desired maximum entry number. In some example embodiments, the maximum entry number may be changed. For example, when the number of key-value entries included in the first leaf node LN1 of leaf nodes is more than the maximum number of entries, the splitting module 141c may delete at least one key-value entry included in the first leaf node LN1, and thus, may generate a deletion log for deleting at least one key-value entry. Also, the splitting module 141c may generate a new leaf node, store at least one key-value entry, deleted in the first leaf node LN1, in the new leaf node, and generate a first log corresponding to the new leaf node.

In order to store the deletion log corresponding to the first leaf node LN1 and the first log corresponding to the new leaf node in the key-value storage device 200, the device driver 160 may generate a write command for the deletion log corresponding to the first leaf node LN1 and the first log corresponding to the new leaf node and may transmit the generated write command to the key-value storage device 200. Operations of the splitting module 141c and the device driver 160 based thereon will be described below in more detail with reference to FIGS. 14, 15A, and 15B.

The log generator 142a may generate a log corresponding to one of leaf nodes in response to a request corresponding to one of the leaf nodes. For example, the log generator 142a may generate a first log 201 corresponding to the first leaf node LN1 in response to a first update request for the first leaf node LN1 of the leaf nodes. Also, the log generator 142a may generate a second log 202 corresponding to the first leaf node LN1 in response to a second update request for the first leaf node LN1.

The log generator 142a may generate a log to include a key-value entry corresponding to a corresponding node. Also, the log generator 142a may generate a log to include information such as a timestamp and a commit ID. The log generator 142a may generate each log so that a maximum size of each log corresponds to a maximum value size of the key-value storage device 200. When a size of data to be stored in a log is greater than a maximum size of the log, the data to be stored in the log may be split into a plurality of logs and may be stored in the key-value storage device 200.

In some example embodiments, the log generator 142a may generate a key of a log so that the key of the log includes, as a prefix, an ID of a corresponding node. For example, the log generator 142a may generate a key of the first log 201 so that the key of the first log 201 includes, as a prefix, E which is an ID of the first leaf node LN1. For example, the log generator 142a may generate a key of the second log 202 so that the key of the second log 202 includes, as a prefix, E which is the ID of the first leaf node LN1.

In some example embodiments, the log generator 142a may generate a key of a log so that the key of the log includes an ID of a node and sequence information about a sorted sequence of the log. For example, the log generator 142a may generate the key of the first log 201 as E:1 so that the key of the first log 201 includes E, which is the ID of the first leaf node LN1, and first sequence information representing a first log. For example, the log generator 142a may generate the key of the second log 202 as E:1 so that the key of the second log 202 includes E, which is the ID of the first leaf node LN1, and second sequence information representing a second log.

In some example embodiments, the log generator 142a may generate a key of a log so that the key of the log includes an ID of a node, sequence information about a sorted sequence of the log, and a timestamp. In an embodiment, the log generator 142a may generate a key of a log so that the key of the log includes an ID of a node and a timestamp.

In some example embodiments, the log generator 142a may add a common prefix to all logs and add information about a corresponding leaf node to a part next to the prefix to generate a key of a log. For example, the common prefix of all logs may correspond to a log mark (for example, L) representing that corresponding data is a log. In some example embodiments, the log generator 142a may generate a key of a log so that the key of the log includes a log mark and includes, as a prefix, an ID of a corresponding node. In some example embodiments, the log generator 142a may generate a key of a log so that the key of the log includes a log mark, an ID of a node, and sequence information about a sorted sequence of the log. In some example embodiments, the log generator 142a may generate a key of a log so that the key of the log includes a log mark, an ID of a node, sequence information about a sorted sequence of the log, and a timestamp.

For example, the log generator 142a may generate the key of the first log 201 as L:E:1 so that the key of the first log 201 includes a log mark, E which is the ID of the first leaf node LN1, and the first sequence information. For example, the log generator 142a may generate the key of the second log 202 as L:E:2 so that the key of the second log 202 includes a log mark, E which is the ID of the first leaf node LN1, and the second sequence information.

As described above, the log generator 142a may add an ID of a leaf node, in which data is to be stored, to a key of a log. Therefore, the host 100a may not perform a read operation on a leaf node and may store data, which is to be stored, in the key-value storage device 200 as a log corresponding to a corresponding leaf node. Also, the host 100a may not separately manage mapping information about a log, and thus, may reduce resources needed for managing a log mapping table.

The repacking module 142b may manage the number of logs for each node and may perform a repacking operation on a node where the total number of logs is more than a predetermined or alternatively, desired maximum log number. In some example embodiments, the maximum log number may be changed. For example, when the number of logs generated for the first leaf node LN1 of leaf nodes is more than the maximum log number, the repacking module 142b may read all logs corresponding to the first leaf node LN1, select only valid data from among the read logs, generate a new log corresponding to the first leaf node LN1 on the basis of the selected valid data, and delete all of existing logs. By performing such a repacking operation, the amount of a space occupied by logs may be adjusted and the number of logs to be read in reconstructing a node may be adjusted, and thus, read performance may be enhanced. An operation of the repacking module 142b will be described below in more detail with reference to FIGS. 16 and 17.

The log collector 142c may collect logs corresponding to each node from the key-value storage device 200. In some example embodiments, the log collector 142c may generate an iterator operation corresponding to an ID of a leaf node which is to be collected. For example, the log collector 142c may generate an iterator operation corresponding to an ID E of the first leaf node LN1 so as to collect the first and second logs 201 and 202 having a key including the ID E of the first leaf node LN1. The device driver 160 may generate an iterator command corresponding to an iterator operation and may transmit the generated iterator command to the key-value storage device 200.

Also, the log collector 142c may collect logs corresponding to each node from the key-value storage device 200 through an individual read operation. In some example embodiments, the log collector 142c may generate a read operation on the basis of sequence information about a sorted sequence of a log and an ID of a leaf node which is to be collected. For example, the log collector 142c may generate a first read operation on the basis of the ID E of the first leaf node LN1 and the first sequence information so as to read the first log 201, and the device driver 160 may generate a first read command corresponding to the first read operation and may transmit the first read command to the key-value storage device 200. For example, the log collector 142c may generate a second read operation on the basis of the ID E of the first leaf node LN1 and the second sequence information so as to read the second log 202, and the device driver 160 may generate a second read command corresponding to the second read operation and may transmit the second read command to the key-value storage device 200.

Figure 4:
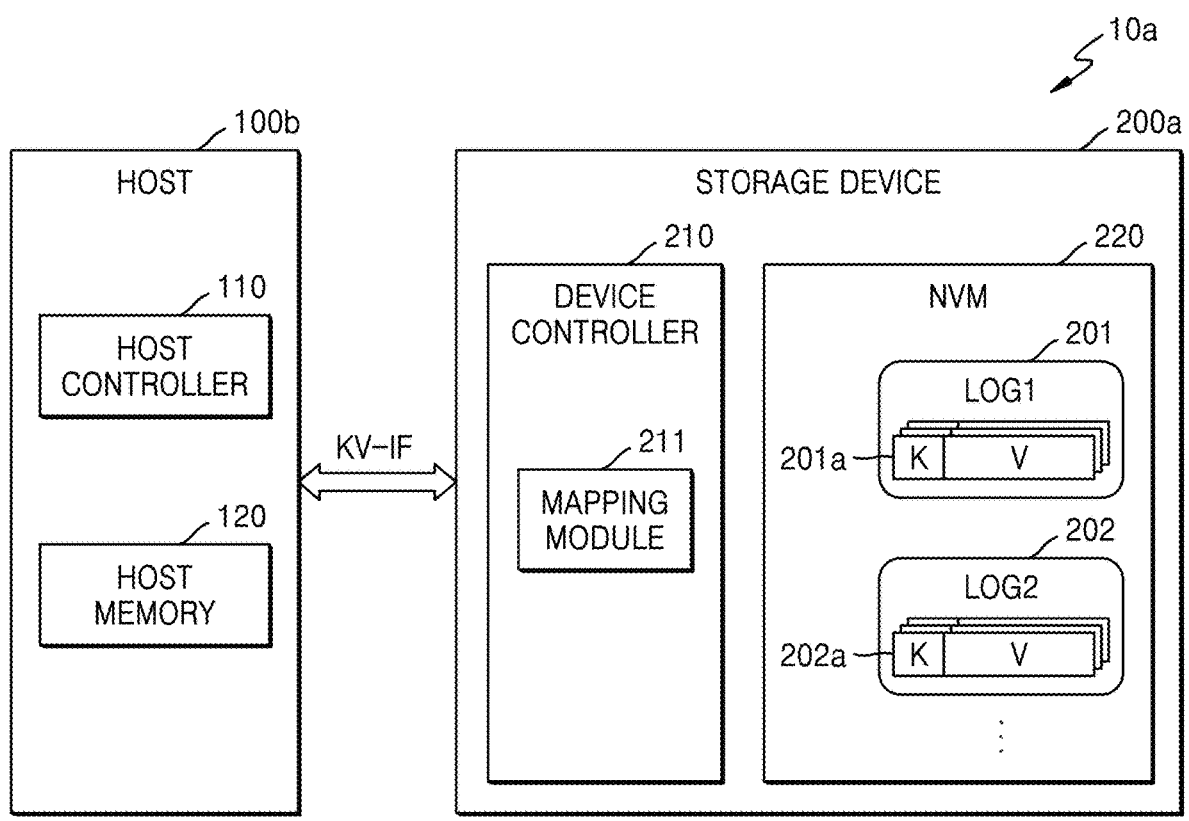
FIG. 4 is a block diagram illustrating a storage system according to some example embodiments.

FIG. 4 is a block diagram illustrating a storage system 10a according to example embodiments.

Referring to FIG. 4, the storage system 10a may include a host 100b and a key-value storage device 200a, the host 100b may include a host controller 110 and a host memory 120, and the key-value storage device 200a may include a device controller 210 and a non-volatile memory 220. The storage system 10a may correspond to an implementation example of the storage system 10 of FIG. 1. Therefore, details described above with reference to FIGS. 1 to 3 may be applied to the inventive concepts, and repeated descriptions are omitted.

The host memory 120 may store a tree structure including an index node and a leaf node, and moreover, may function as a buffer memory for temporarily storing a key-value command or a key-value object to be transmitted to the key-value storage device 200a or a key-value object transmitted from the key-value storage device 200a. For example, the host memory 120 may include an input/output queue. The host controller 110 may manage an operation of storing a key-value object (for example, write data) of a buffer region of the host memory 120 in the non-volatile memory 220, or storing a key-value object (for example, read data) of the non-volatile memory 220 in the buffer region of the host memory 120.

In some example embodiments, the index management module 140 and the device driver 160 may each be implemented as software and may be loaded into the host memory 120, and the host controller 110 may access the host memory 120, whereby operations of the index management module 140 and the device driver 160 may be performed.

According to some example embodiments, the host controller 110 and the host memory 120 may each be implemented as a separate semiconductor chip. Also, in some example embodiments, the host controller 110 and the host memory 120 may be integrated into the same semiconductor chip. For example, the host controller 110 may be one of a plurality of modules included in an application processor, and the application processor may be implemented as a system on chip (SoC). Also, the host memory 120 may be an embedded memory included in the application processor or may be a non-volatile memory or a memory module disposed outside the application processor.

The device controller 210 may control the non-volatile memory 220 to write a plurality of logs, including the first log 201 and the second log 202, in the non-volatile memory 220 in response to a write command from the host 100a. Also, the device controller 210 may control the non-volatile memory 220 to read the plurality of logs, including the first log 201 and the second log 202, stored in the non-volatile memory 220 in response to an iterator command or a read command from the host 100a. As described above, the key-value storage device 200a may perform a data storage operation and a data read operation like a general storage device. In some example embodiments, the device controller 210 may include a mapping module 211, and the mapping module 211 may include a key-to-physical address (K2P) mapping module which maps a key, included in a command received from the host 100b, to a physical address of the non-volatile memory 220 on the basis of a key-value interface KV-IF.

The non-volatile memory 220 may store a plurality of logs including the first and second logs 201 and 202. Also, the non-volatile memory 220 may store a plurality of key-value objects, and the plurality of key-value objects may include a meta object including file information and a data object including content of a file. According to some example embodiments, the non-volatile memory 220 may be implemented with a plurality of memory chips or a plurality of memory dies. For example, each of the plurality of memory chips may include a dual die package (DDP), a quadruple die package (QDP), or an octuple die package (ODP).

When the non-volatile memory 220 includes flash memory, the flash memory may include two-dimensional (2D) NAND memory array or a three-dimensional (3D) (or vertical) NAND (VNAND) memory array. As another example, the key-value storage device 200a may include other various kinds of non-volatile memories. For example, the key-value storage device 200a may apply magnetic random access memory (RAM) (MRAM), spin-transfer torque MRAM, conductive bridging RAM (CBRAM), ferroelectric RAM (FeRAM), phase RAM (PRAM), resistive RAM (RRAM), and other various kinds of memories.

In some example embodiments, the key-value storage device 200a may be implemented as a DRAMless device, and the DRAMless device may be referred to as a device including no DRAM cache. In some example embodiments, the device controller 210 may not include a DRAM controller. For example, the key-value storage device 200a may use a partial region of the non-volatile memory 220 as a buffer memory.

In some example embodiments, the key-value storage device 200a may include an internal memory embedded in an electronic device. For example, the key-value storage device 200a may include an embedded universal flash storage (UFS) memory device, an embedded multimedia card (eMMC), or a solid state drive (SSD). However, the inventive concepts are not limited thereto, and the key-value storage device 200a may include, for example, one time programmable read-only memory (ROM) (OTPROM), programmable ROM (PROM), erasable and programmable ROM (EPROM), electrically erasable and programmable ROM (EEPROM), mask ROM, or flash ROM. In some example embodiments, the key-value storage device 200a may include an external memory detachable/attachable from/on an electronic device. For example, the key-value storage device 200a may include at least one of a UFS memory card, compact flash (CF), secure digital (SD), micro secure digital (micro-SD), mini secure digital (mini-SD), extreme digital (xD), and memory stick.

The storage system 10a may be implemented with, for example, a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book. Also, the storage system 10a may be implemented with, for example, various types of electronic devices such as a wearable device such as a watch or a head-mounted display (HMD).

Figure 5:
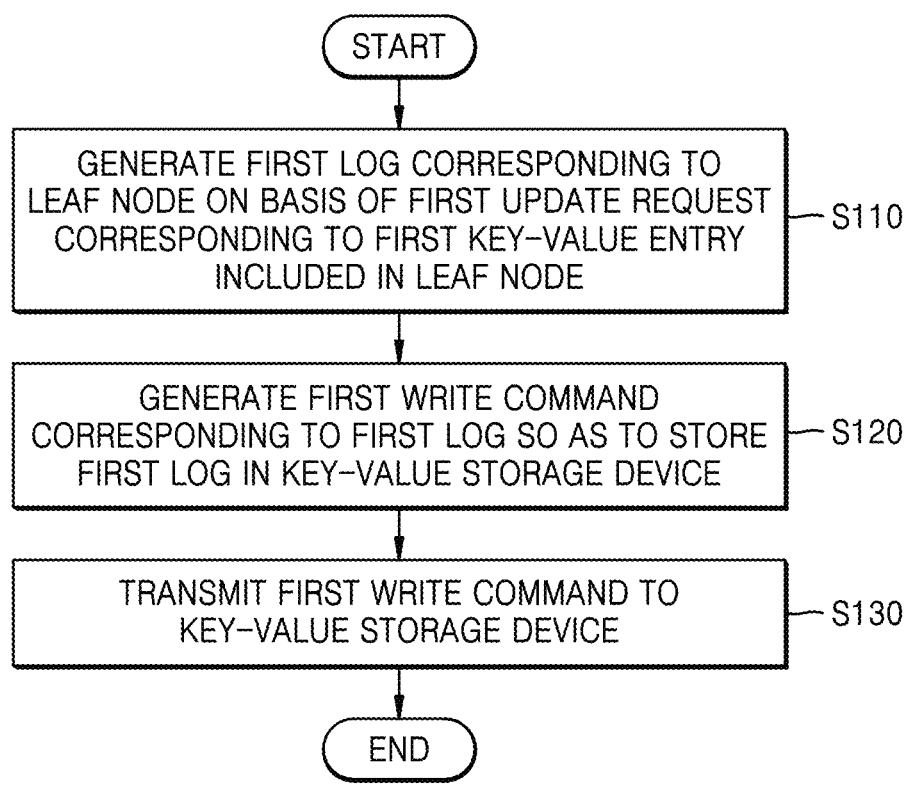
FIG. 5 is a flowchart illustrating an operating method of a host, according to some example embodiments.

FIG. 5 is a flowchart illustrating an operating method of a host, according to example embodiments.

Referring to FIG. 5, the operating method of the host according to some example embodiments may correspond to a method of generating a log corresponding to a node in a tree structure and storing the generated log in a key-value storage device, and for example, may include operations which are time-serially performed in the host 100, 100a, or 100b of FIG. 1, 3, or 4. Details described above with reference to FIGS. 1 to 4 may be applied to the inventive concepts, and repeated descriptions are omitted. Hereinafter, the operating method of the host will be described with reference to FIGS. 1, 3, and 5.

In operation S110, the host 100 may generate the first log 201 corresponding to a leaf node on the basis of a first update request corresponding to a first key-value entry included in the leaf node. In detail, the host 100 may generate, as the first log 201, a first new key-value entry including a first value updated based on the first update request. For example, the log generator 142a may generate the first log 201 corresponding to the first leaf node LN1 on the basis of the first update request.

In operation S120, the host 100 may generate a first write command corresponding to the first log 201 so as to store the first log 201 in the key-value storage device 200. In operation S130, the host 100 may transmit the first write command to the key-value storage device 200. For example, the device driver 160 may generate the first write command corresponding to the first log 201 and may transmit the generated first write command to the key-value storage device 200 through the key-value interface KV-IF.

Figure 6:
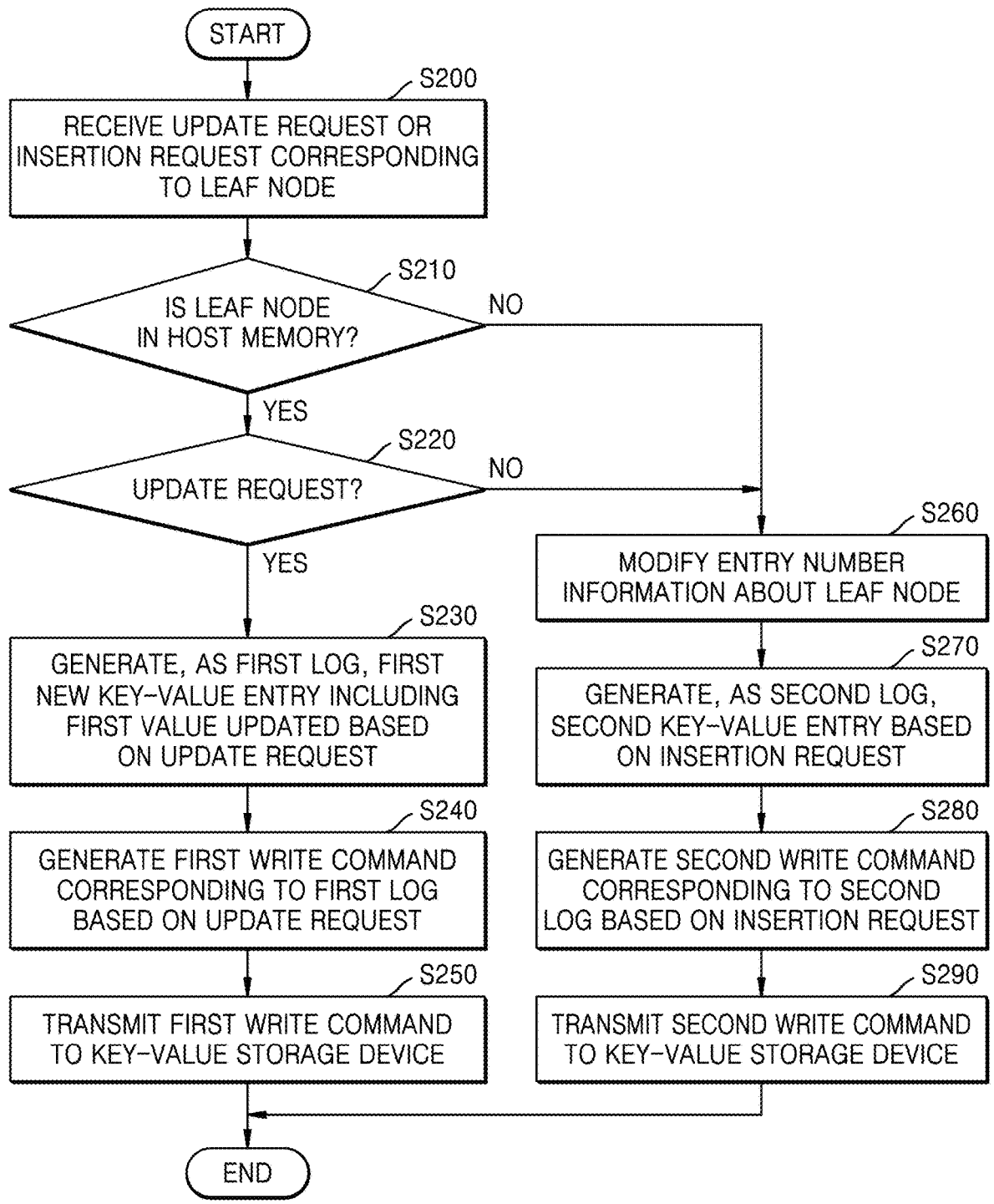
FIG. 6 is a flowchart illustrating an operating method of a host, according to some example embodiments.

FIG. 6 is a flowchart illustrating an operating method of a host, according to example embodiments.

Referring to FIG. 6, the operating method of the host according to some example embodiments may correspond to an implementation example of the operating method of FIG. 5, and for example, may include operations which are time-serially performed in the host 100, 100a, or 100b of FIG. 1, 3, or 4. Details described above with reference to FIGS. 1 to 5 may be applied to the inventive concepts, and repeated descriptions are omitted. Hereinafter, the operating method of the host will be described with reference to FIGS. 1, 3, and 6.

In operation S200, the host 100 may receive an update request or an insertion request corresponding to a leaf node. For example, a user request received through the application AP may correspond to an update request or an insertion request corresponding to the leaf node. In operation S210, the host 100 may determine whether a leaf node corresponding to a received request is in the host memory 120. When the leaf node is not in the host memory 120, the host 100 may perform operation S260 on the assumption that the received request is the insertion request.

When the leaf node is in the host memory 120, the host 100 may determine whether the received request is the update request in operation S220. When the received request is not the update request, the host 100 may determine that the received request is the insertion request and may perform operation S260. In operation S260, the host 100 may modify entry number information about the leaf node. For example, the host 100 may increase, by one, the entry number information about the leaf node in an insertion operation. In some example embodiments, when the number of entries corresponding to the leaf node is less than or equal to the maximum number of entries, the host 100 may generate data as a log, and when the number of entries is greater than the maximum number of entries, the host 100 may first perform a node split operation and then may generate data as a log.

When the received request is the update request, in operation S230, the host 100 may generate, as a first log, a first new key-value entry including the first value updated based on the update request. For example, operation S230 may be performed by the log generator 142a of the index management module 140. In operation S240, the host 100 may generate a first write command corresponding to the first log based on the update request. In operation S250, the host 100 may transmit the first write command to the key-value storage device 200. For example, operations S280 and S290 may be performed by the device driver 160.

In operation S270, the host 100 may generate, as a second log, a second key-value entry based on the insertion request. For example, operation S270 may be performed by the log generator 142a of the index management module 140. In operation S280, the host 100 may generate a second write command corresponding to the second log based on the insertion request. In operation S290, the host 100 may transmit the second write command to the key-value storage device 200. For example, operations S280 and S290 may be performed by the device driver 160.

Figure 7A:
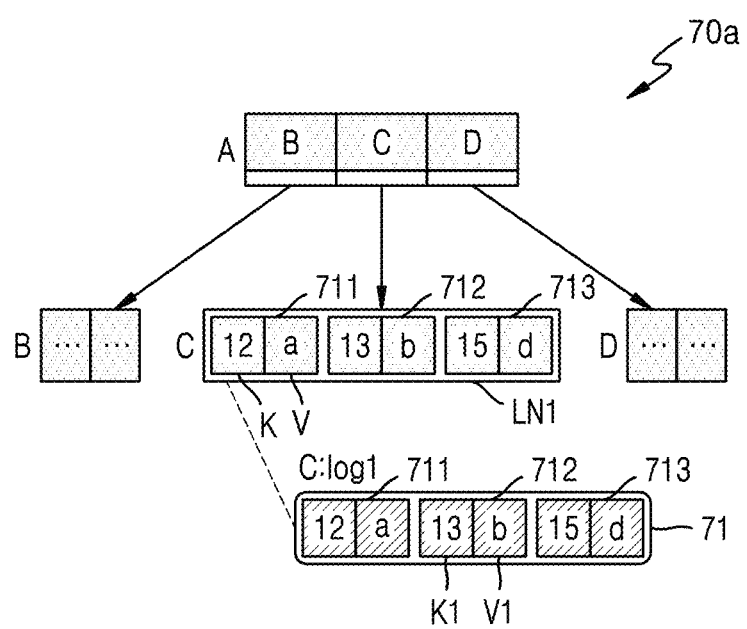
FIGS. 7A and 7B illustrate an insertion operation and an updating operation according to some example embodiments.
Figure 7B:
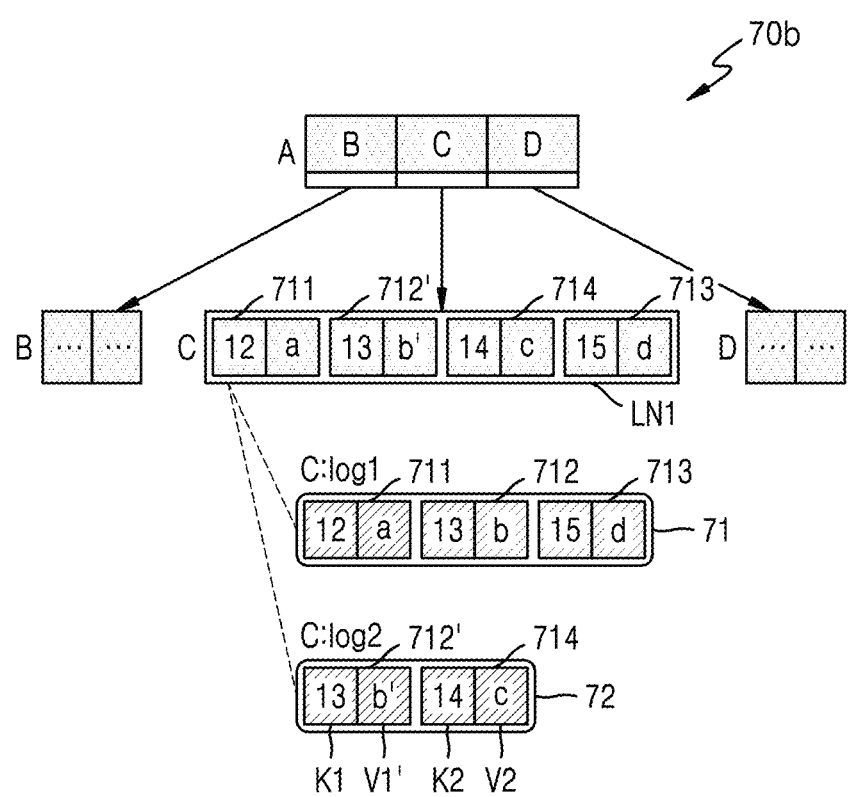

FIGS. 7A and 7B illustrate an insertion operation and an updating operation according to some example embodiments.

Referring to FIGS. 1 and 7A, the host 100 may generate a tree structure 70a which includes an index node illustrated by A and leaf nodes illustrated by B, C, and D. The first leaf node LN1 of leaf nodes may include first to third key-value entries 711 to 713. In some example embodiments, each of the first to third key-value entries 711 to 713 may include a key K and a value V. For example, the first key-value entry 711 may include a key 12 and a value a, the second key-value entry 712 may include a key 13 and a value b, and the third key-value entry 713 may include a key 15 and a value d.

The index management module 140 may generate a first log 71, corresponding to the first leaf node LN1, as C:log 1, and the device driver 160 may generate a write command corresponding to the first log 71 so as to store the generated first log 71 in the key-value storage device 200 and may transmit the generated write command to the key-value storage device 200. Therefore, the key-value storage device 200 may store the first log 71 including the first to third key-value entries 711 to 713 in response to the write command. For example, a first key K1 of the first key-value entry 712 may be 13, and a first value V1 may be b.

Referring to FIGS. 1 and 7B, the host 100 may update a tree structure 70a to a tree structure 70b on the basis of an update request and an insertion request for the first leaf node LN1. In detail, the index management module 140 may generate an updated second key-value entry 712' on the basis of an update request for a second key-value entry 712 and may insert a fourth key-value entry 714 into the first leaf node LN1 on the basis of an insertion request of the fourth key-value entry 714. Also, the index management module 140 may generate, as C:log 2, a second log 72 including the updated second key-value entry 712' and the fourth key-value entry 714.

The device driver 160 may generate a write command corresponding to the second log 72 so as to store the generated second log 72 in the key-value storage device 200 and may transmit the generated write command to the key-value storage device 200. Therefore, the key-value storage device 200 may store the second log 72 including the updated second key-value entry 712' and the fourth key-value entry 714 in response to the write command. For example, a first key K1 of the updated second key-value entry 712' may be 13, and a first value V1' updated based on the update request may be b'. For example, a second key K2 of the fourth key-value entry 714 may be 14, and a second value V2 may be c.

FIG. 8 illustrates an insertion operation algorithm according to some example embodiments. Referring to FIGS. 6 to 8, the operating method of the host illustrated in FIG. 6 may be implemented as an oak tree insertion process illustrated in FIG. 8. Here, an oak tree may be referred to as a tree structure according to some example embodiments. When a leaf node is not in a memory, the number of entries of the leaf node may increase by one, and a split operation may be performed based on a comparison result obtained by comparing the number of entries of the leaf node with the maximum number of entries $T_{split}$.

Figure 9:
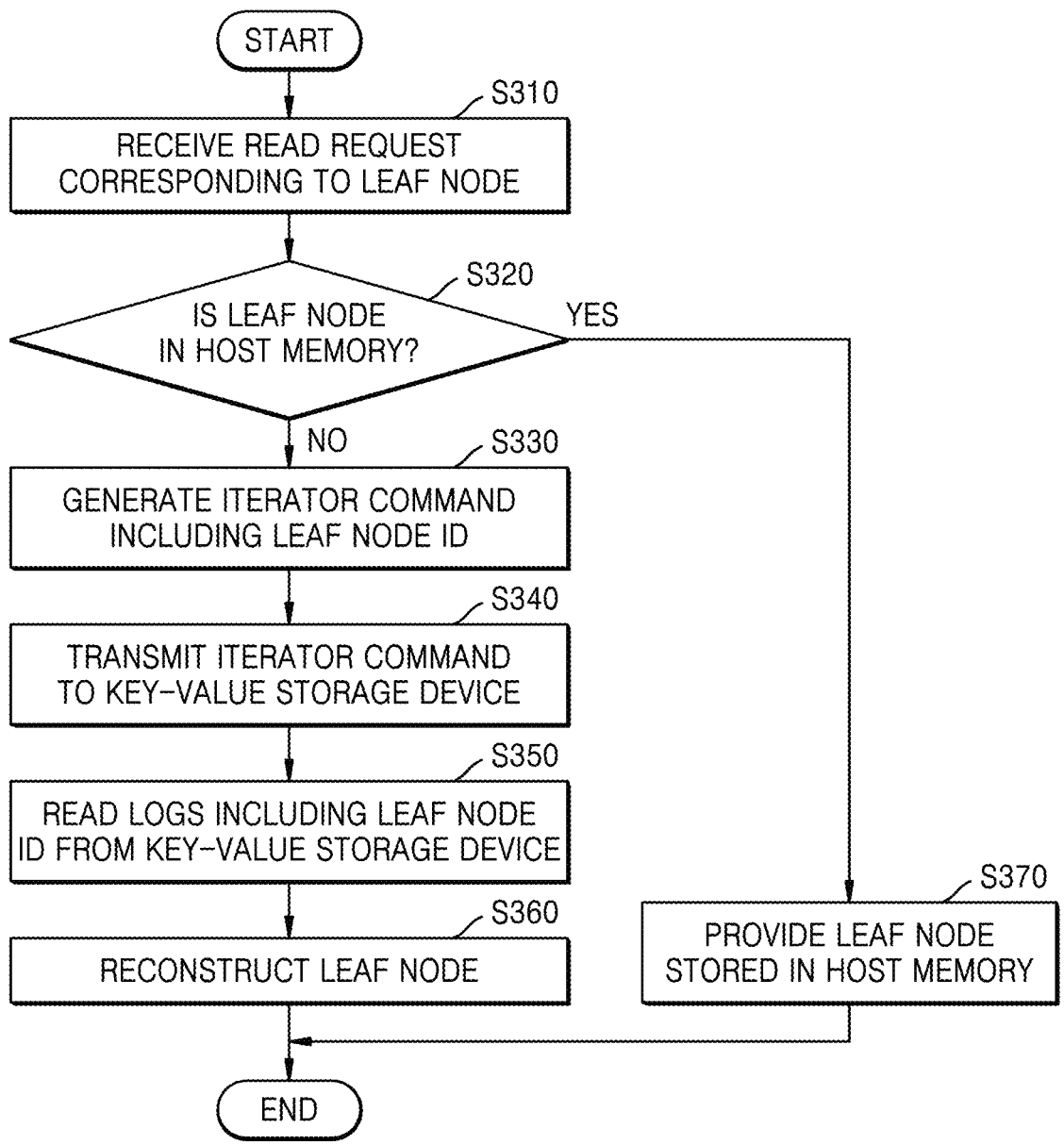
FIG. 9 is a flowchart illustrating an operating method of a host, according to some example embodiments.

FIG. 9 is a flowchart illustrating an operating method of a host, according to some example embodiments.

Referring to FIG. 9, the operating method of the host according to some example embodiments may be a method of performing a read operation corresponding to a leaf node, and for example, may include operations which are time-serially performed in the host 100, 100*a*, or 100*b* of FIG. 1, 3, or 4. Details described above with reference to FIGS. 1 to 4 may be applied to the inventive concepts, and repeated descriptions are omitted. Hereinafter, the operating method of the host will be described with reference to FIGS. 1 and 9.

In operation S310, the host 100 may receive a read request corresponding to a leaf node. For example, the host 100 may receive the read request corresponding to the leaf node on the basis of a user input through an application. In operation S320, the host 100 may determine whether the leaf node corresponding to the read request is in the host memory 120. When it is determined that the leaf node is in the host memory 120, the host 100 may provide the leaf node stored in the host memory 120 in step S370. For example, the host 100 may provide a user with the leaf node stored in the host memory 120 through an application.

When the leaf node is not in the host memory 120, the host 100 may generate an iterator command including a leaf node ID in operation S330. In operation S340, the host 100 may transmit the iterator command to the key-value storage device 200. In operation S350, the host 100 may read logs including the leaf node ID from the key-value storage device 200. In operation S360, the host 100 may reconstruct the leaf node on the basis of read logs.

Figure 10:
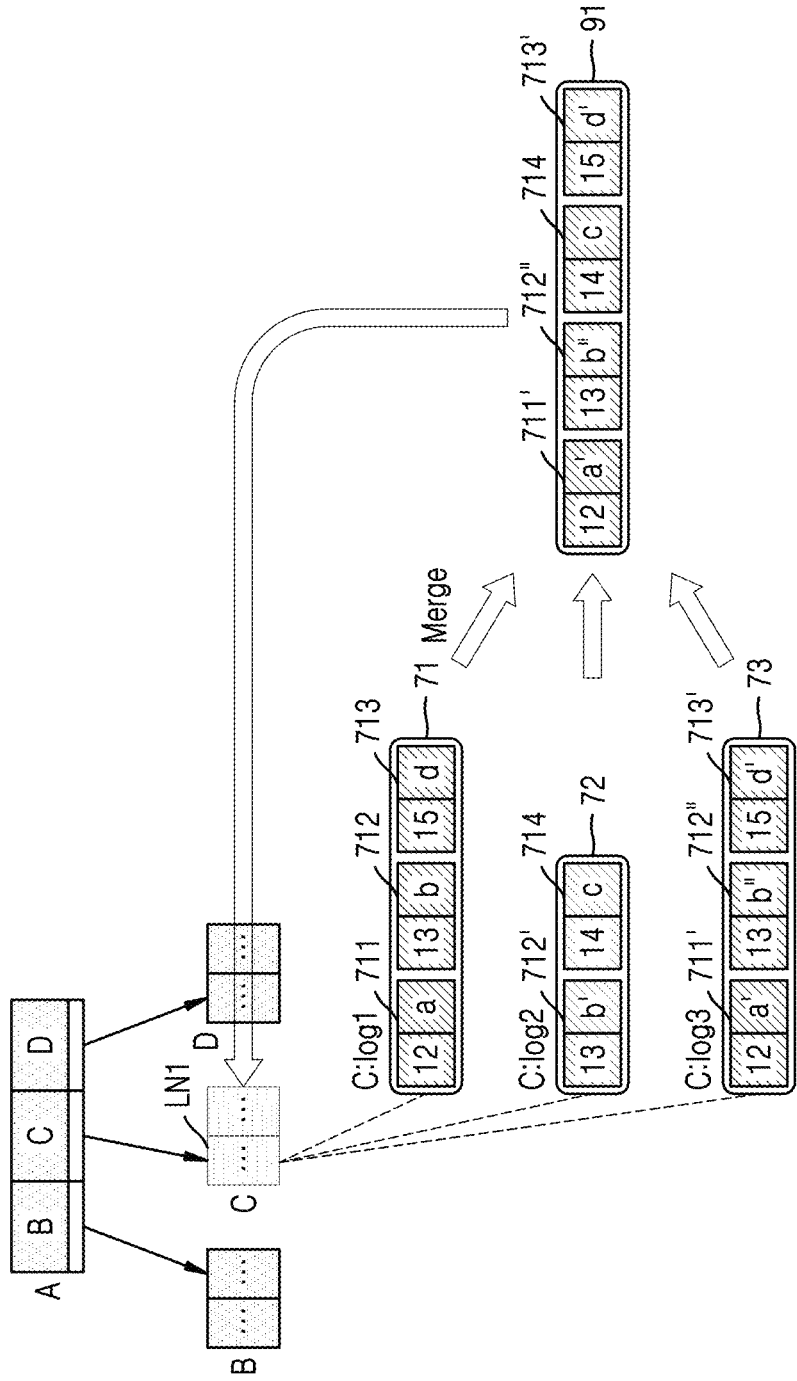
FIG. 10 illustrates a read operation according to some example embodiments.

FIG. 10 illustrates a read operation according to some example embodiments.

Referring to FIGS. 1 and 10, the host 100 may generate an iterator command including an ID of the first leaf node LN1 on the basis of a read request for the first leaf node LN1 and may transmit the generated iterator command to the key-value storage device 200. In response to the iterator command, the key-value storage device 200 may read a first log 71 (e.g., C:log 1), a second log 72 (e.g., C:log 2), and a third log 73 (e.g., C:log 3) each including C which is an ID of the first leaf node LN1 as a prefix and may transmit the first log 71, the second log 72, and the third log 73 to the host 100. For example, the first log 71 may include first to third key-value entries 711 to 713, the second log 72 may include an updated second key-value entry 712' and an inserted fourth key-value entry 714, and the third log 73 may include an updated first key-value entry 711', an updated second key-value entry 712", and an updated third key-value entry 713'.

The host 100 may merge the first log 71, the second log 72, and the third log 73 and may insert valid data into a node 91 to reconstruct the node 91. In some example embodiments, the valid data may include a latest key-value entry corresponding to the same key, and for example, may include the updated first key-value entry 711', the updated second key-value entry 712", an inserted fourth key-value entry 714, and the updated third key-value entry 713'.

FIG. 11 illustrates a read operation algorithm according to some example embodiments. Referring to FIGS. 9 to 11, the operating method of the host illustrated in FIG. 9 may be implemented as an oak tree read process illustrated in FIG. 11. Here, an oak tree may be referred to as a tree structure according to some example embodiments. Node reconstruction may be performed on nodes which are not in a memory.

In detail, all logs (for example, first to third logs 71 to 73 (e.g., C:log 1, C:log 12, and C:log 3)) including a node ID may be collected from a key-value storage device, and all collected logs may be merged.

Figure 12:
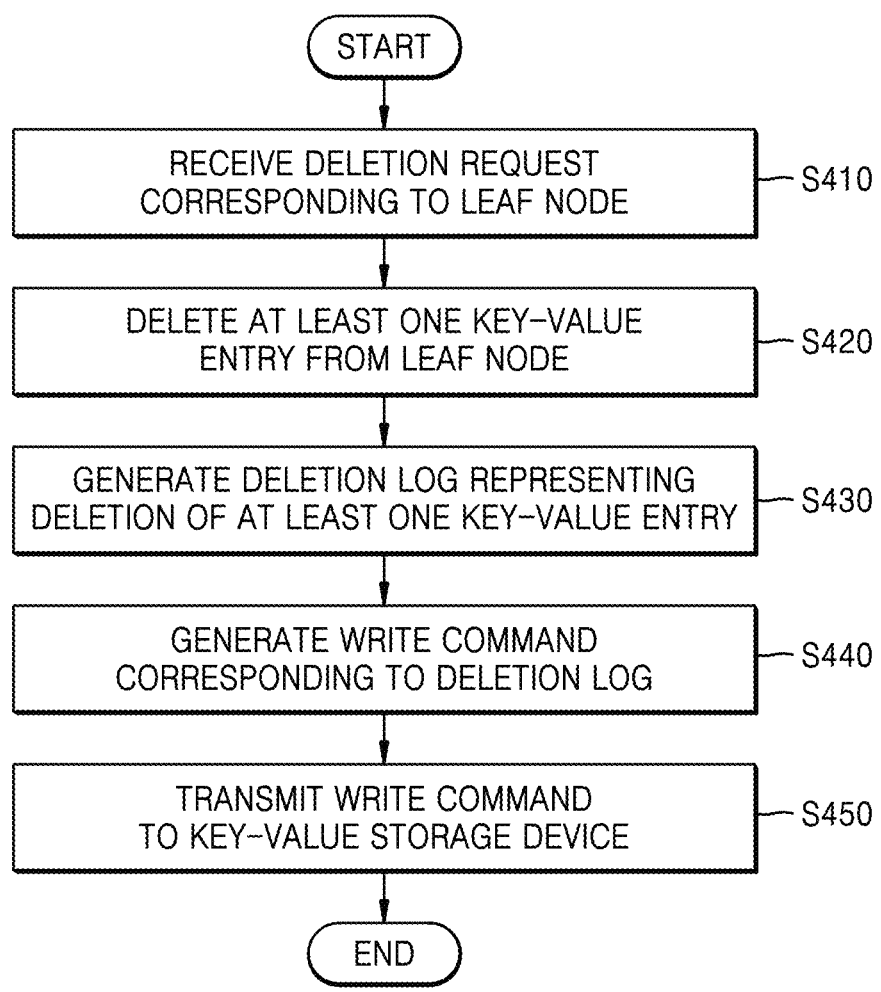
FIG. 12 is a flowchart illustrating an operating method of a host, according to some example embodiments.

FIG. 12 is a flowchart illustrating an operating method of a host, according to example embodiments.

Referring to FIG. 12, the operating method of the host according to some example embodiments may correspond to a method of generating a deletion log corresponding to a leaf node in a tree structure and storing the generated deletion log in a key-value storage device, and for example, may include operations which are time-serially performed in the host 100, 100*a*, or 100*b* of FIG. 1, 3, or 4. Details described above with reference to FIGS. 1 to 4 may be applied to the inventive concepts, and repeated descriptions are omitted. Hereinafter, the operating method of the host will be described with reference to FIGS. 1 and 12.

In operation S410, the host 100 may receive a deletion request corresponding to a leaf node. For example, the host 100 may receive the deletion request corresponding to the leaf node on the basis of a user input through an application. In operation S420, the host 100 may delete at least one key-value entry from the leaf node. In operation S430, the host 100 may generate a deletion log representing the deletion of the at least one key-value entry. For example, the index management module 140 may include a key of the key-value entry to be deleted and may generate the deletion log including a deletion mark (for example, tombstone) as a value. In operation S440, the host 100 may generate a write command corresponding to the deletion log. In operation S450, the host 100 may transmit the write command to the key-value storage device 200.

Figure 13:
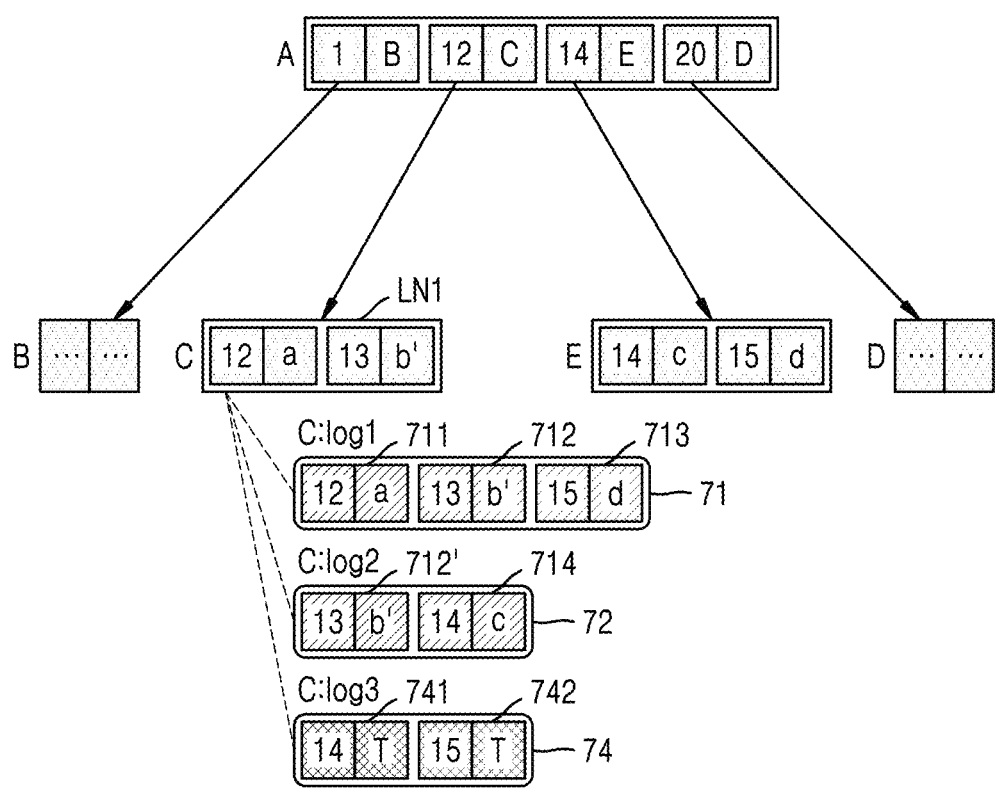
FIG. 13 illustrates a deletion operation according to some example embodiments.

FIG. 13 illustrates an erase operation according to some example embodiments.

Referring to FIGS. 1 and 13, the host 100 may delete some key-value entries in the first leaf node LN1 on the basis of a deletion request corresponding to the first leaf node LN1. Also, the host 100 may generate a deletion log 74 (e.g., C:log 3) corresponding to the deleted key-value entries and may store the generated deletion log 74 in the key-value storage device 200. Also, the index management module 140 may store the deletion log 74 in the key-value storage device 200, and then, may modify the number of entries corresponding to the first leaf node LN1.

The deletion log 74 may include a first deletion entry 741 representing deletion of a fourth key-value entry 714 included in a second log 72 and a second deletion entry 742 representing deletion of a third key-value entry 713 included in a first log 71. For example, the first deletion entry 741 may include the same key 14 as that of the fourth key-value entry 714 and deletion mark T, and the second deletion entry 742 may include the same key 15 as that of the third key-value entry 713 and deletion mark T. As described above, it may be seen that the deletion log 74 including the deletion mark T as a value is stored in the key-value storage device 200, and thus, a key-value entry included in the deletion key 74 in a mergence process of the first leaf node LN1 is a deleted key-value entry.

Figure 14:
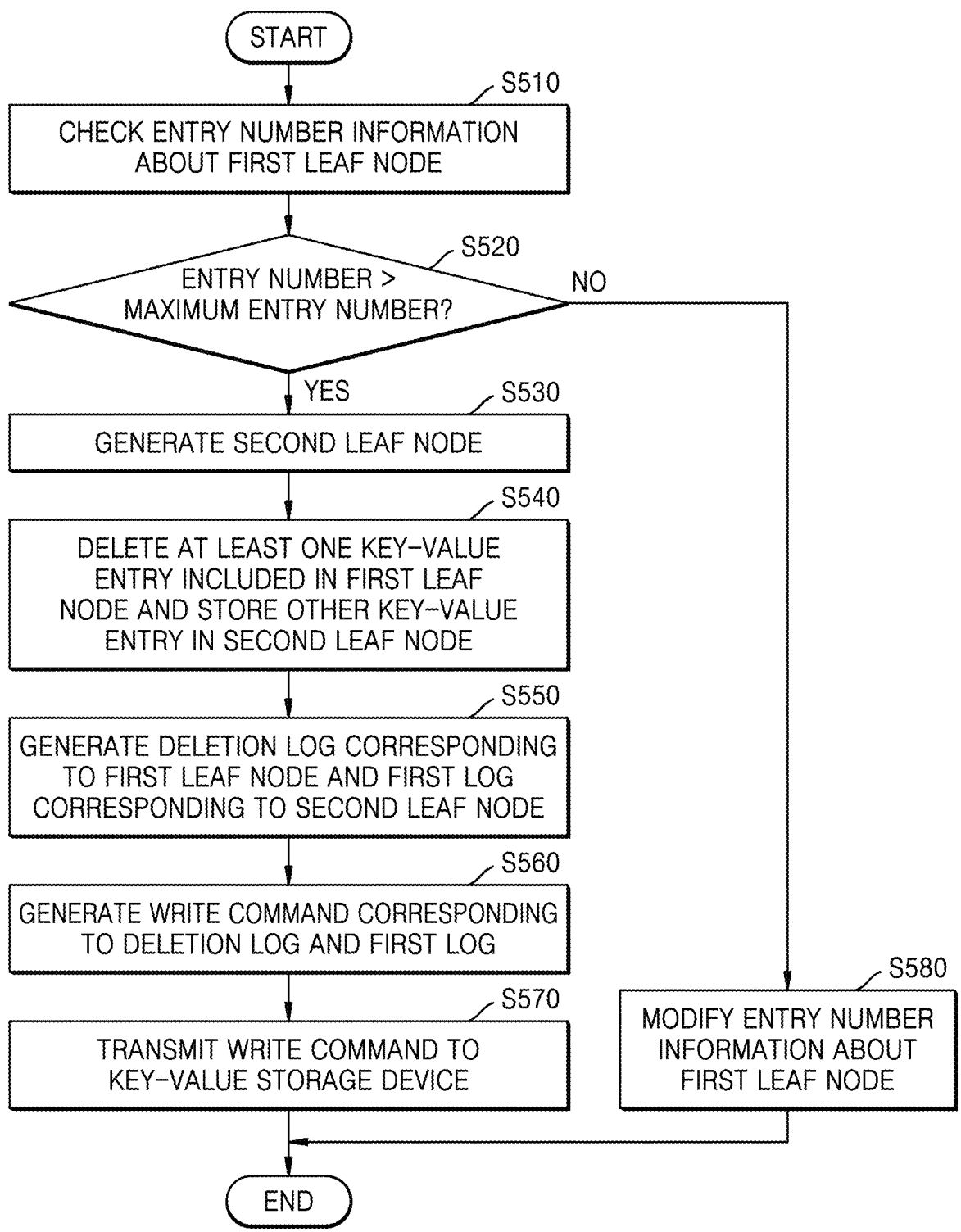
FIG. 14 is a flowchart illustrating an operating method of a host, according to some example embodiments.

FIG. 14 is a flowchart illustrating an operating method of a host, according to example embodiments.

Referring to FIG. 14, the operating method of the host according to some example embodiments may be a method of performing a split operation in a tree structure, and for example, may include operations which are time-serially performed in the host 100, 100*a*, or 100*b* of FIG. 1, 3, or 4. Details described above with reference to FIGS. 1 to 4 may be applied to the inventive concepts, and repeated descriptions are omitted. Hereinafter, the operating method of the host will be described with reference to FIGS. 1 and 14.

In operation S510, the host 100 may check entry number information about a first leaf node. In operation S520, the host 100 may determine whether the number of entries is more than the maximum number of entries. When it is determined that the number of entries is not more than the maximum number of entries, the host 100 may normally modify the entry number information about the first leaf node in operation S580. When it is determined that the number of entries is more than the maximum number of entries, the host 100 may generate a second leaf node in operation S530. In operation S540, the host 100 may delete at least one key-value entry included in the first leaf node and may store the other key-value entry in the second leaf node. In operation S550, the host 100 may generate a deletion log corresponding to the first leaf node and a first log corresponding to the second leaf node. In operation S560, the host 100 may generate a write command corresponding to the deletion log and the first log. In operation S570, the host 100 may transmit the write command to the key-value storage device 200.

Figure 15A:
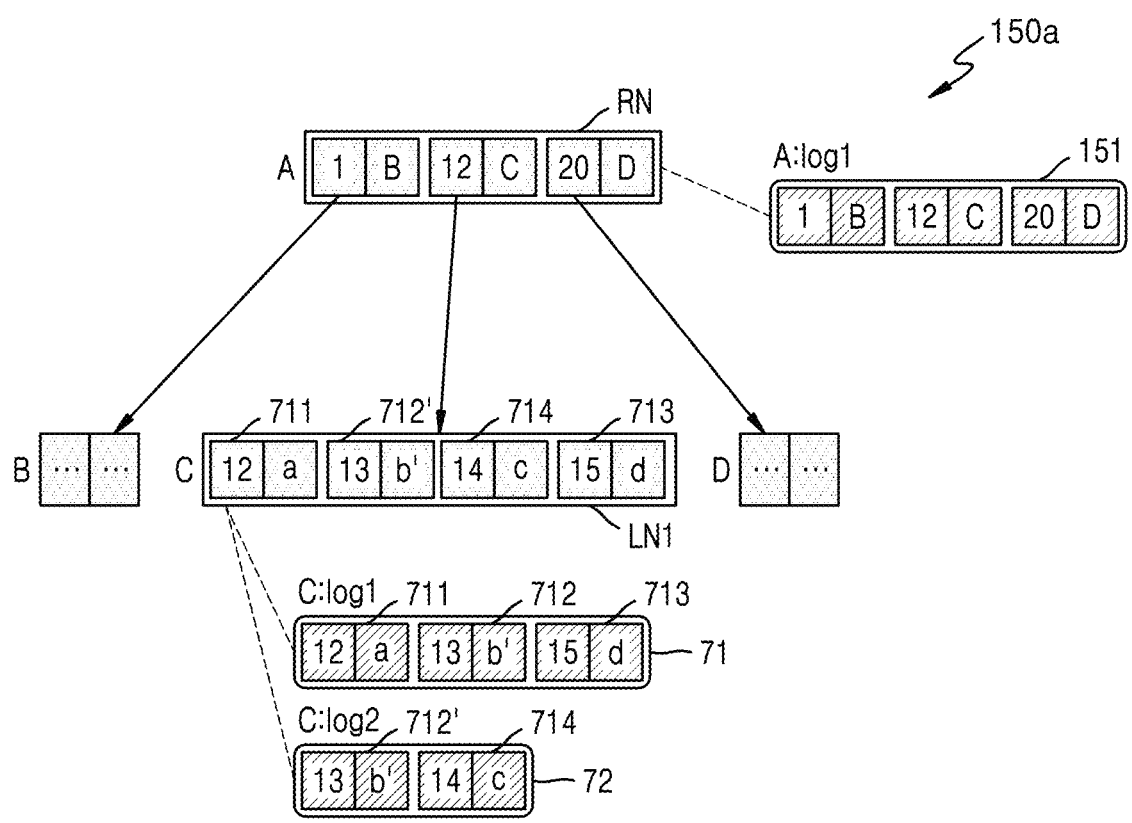
FIG. 15A illustrates a tree structure before performing a split operation according to some example embodiments.
Figure 15B:
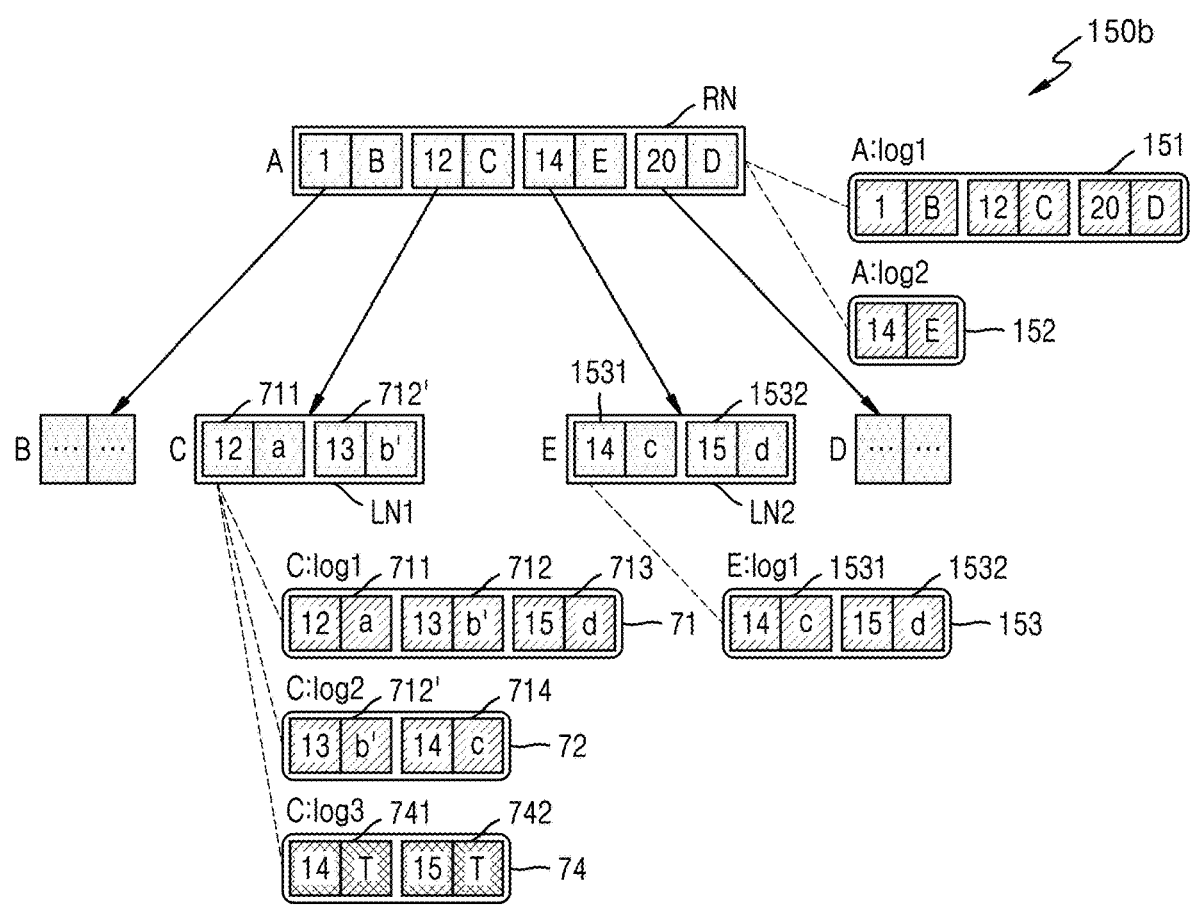
FIG. 15B illustrates a tree structure after performing a split operation according to some example embodiments.

FIG. 15A illustrates a tree structure 150a before performing a split operation according to some example embodiments, and FIG. 15B illustrates a tree structure 150b after performing a split operation according to some example embodiments.

Referring to FIGS. 1 and 15A, a first leaf node LN1 included in the tree structure 150a may include a first key-value entry 711, an updated second key-value entry 712', a third key-value entry 713, and a fourth key-value entry 714. Therefore, the number of entries of the first leaf node LN1 may correspond to 4. For example, when the maximum number of entries is 3, the number of entries of the first leaf node LN1 may be more than the maximum number of entries, and thus, the index management module 140 may perform a split operation on the first leaf node LN1. Also, the index management module 140 may generate a first log 151 (for example, A:log 1) corresponding to a root node RN, and the device driver 160 may transmit a write command for storing the first log 151 in the key-value storage device 200.

Referring to FIGS. 1 and 15B, the index management module 140 may delete the third key-value entry 713 and the fourth key-value entry 714 each included in the first leaf node LN1 and may generate a deletion log 74 (for example, C:log 3) corresponding to the deleted third key-value entry 713 and fourth key-value entry 714. The device driver 160 may transmit a write command for storing the deletion log 74 in the key-value storage device 200. Also, the index management module 140 may generate a second leaf node LN2, store the third key-value entry 713 and the fourth key-value entry 714, deleted from the first leaf node LN1, in the second leaf node LN2, and generate a first log 153 (for example, E:log 1) corresponding to the second leaf node LN2. The device driver 160 may transmit a write command for storing the generated first log 153 in the key-value storage device 200. Therefore, the key-value storage device 200 may store the deletion log 74 and the first log 153.

Also, the index management module 140 may add information, associated with addition of the second leaf node LN2, to the root node RN on the basis of a split operation. For example, when a key is 14 or more and less than 20, the index management module 140 may add an entry, indicating the second leaf node LN2, to the root node RN. Also, the index management module 140 may generate a second log 152 (for example, A:log 2) on the basis of the added entry.

The device driver 160 may transmit a write command for storing the generated second log 152 in the key-value storage device 200. Therefore, the key-value storage device 200 may store the second log 152.

Figure 16:
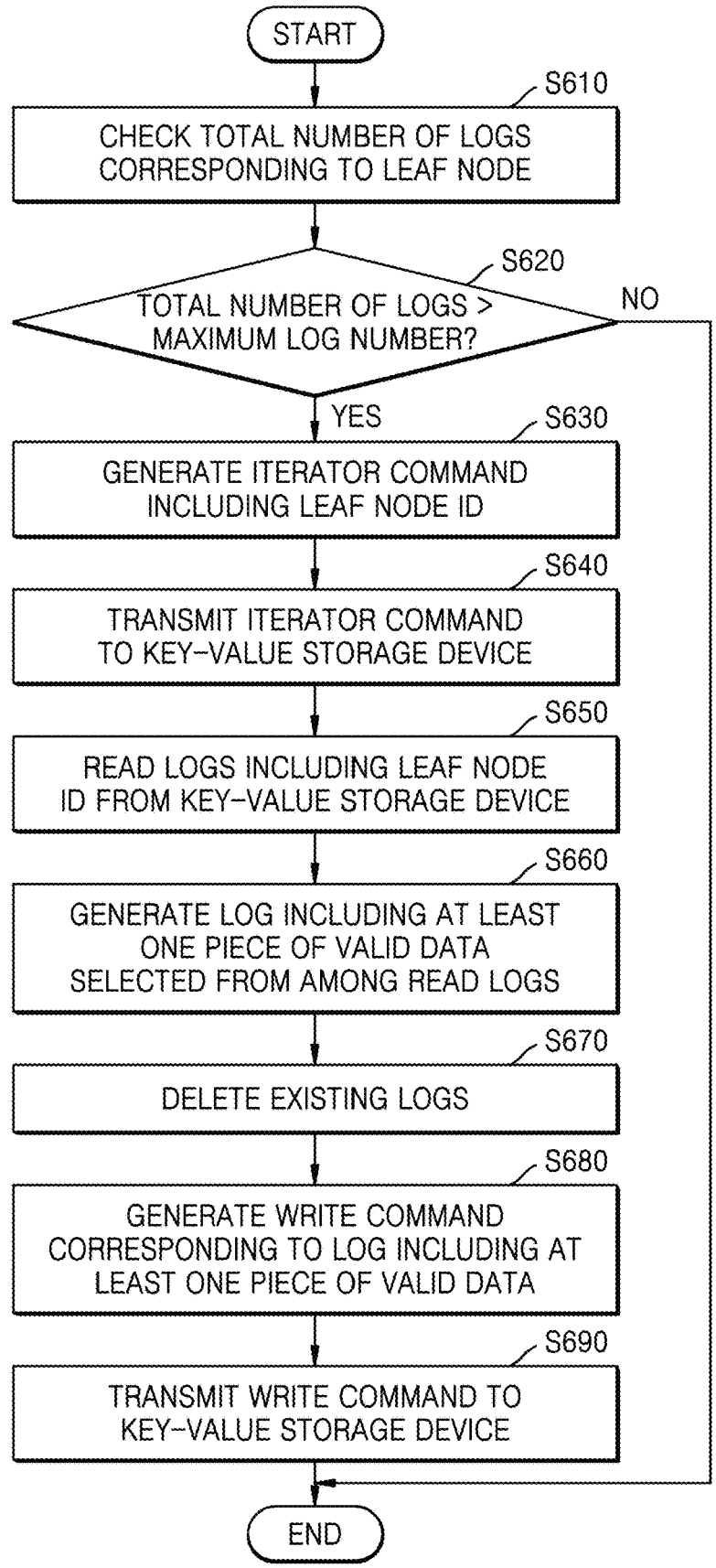
FIG. 16 is a flowchart illustrating an operating method of a host, according to some example embodiments.

FIG. 16 is a flowchart illustrating an operating method of a host, according to some example embodiments.

Referring to FIG. 16, the operating method of the host according to some example embodiments may be a method of performing a repacking operation on a node, and for example, may include operations which are time-serially performed in the host 100, 100a, or 100b of FIG. 1, 3, or 4. Details described above with reference to FIGS. 1 to 4 may be applied to the inventive concepts, and repeated descriptions are omitted. Hereinafter, the operating method of the host will be described with reference to FIGS. 1 and 16.

In operation S610, the host 100 may check the total number of logs corresponding to a leaf node. In operation S620, the host 100 may determine whether the total number of logs is more than the maximum log number. When it is determined that the total number of logs is more than the maximum log number, the host 100 may generate an iterator command including a leaf node ID in operation S630. In operation S640, the host 100 may transmit the iterator command to the key-value storage device 200. In operation S650, the host 100 may read logs including the leaf node ID from the key-value storage device 200. In operation S660, the host 600 may select at least one piece of valid data from the read logs and may generate a log including the selected at least one piece of valid data. In operation S670, the host 100 may delete existing logs. Here, the existing logs may correspond to the logs read from the key-value storage device 200. In operation S680, the host 100 may generate a write command corresponding to a log including the at least one piece of valid data. In operation S690, the host 100 may transmit the write command to the key-value storage device 200.

Figure 17:
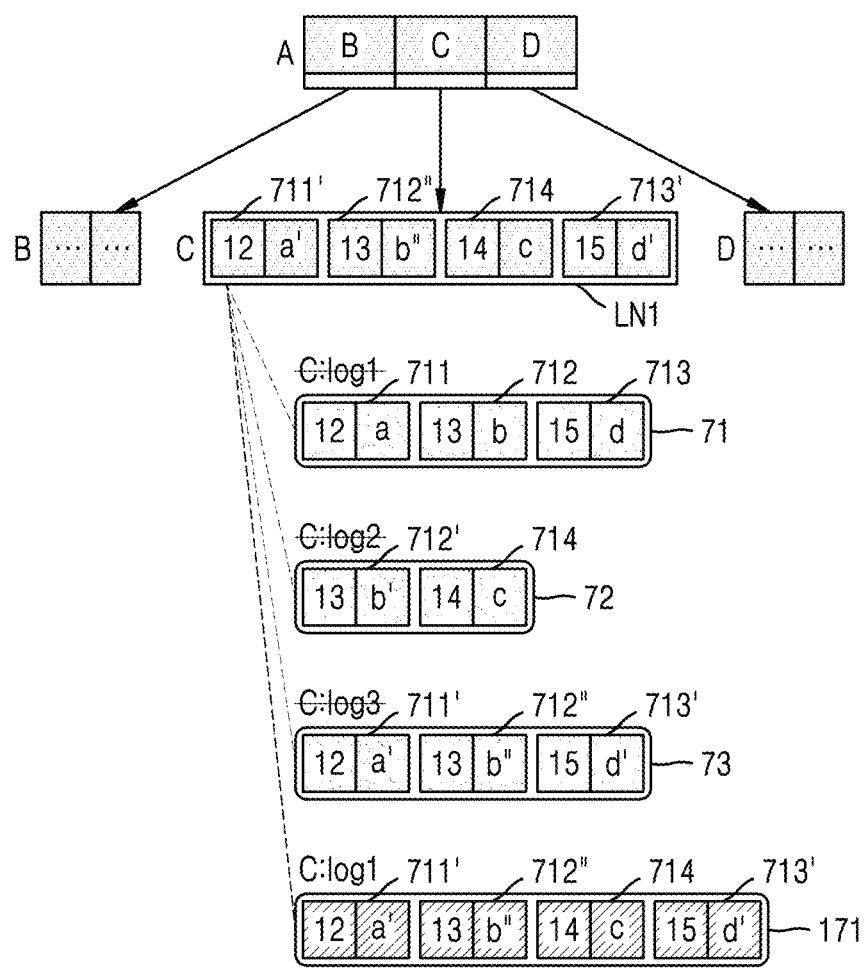
FIG. 17 illustrates a repacking operation according to some example embodiments.

FIG. 17 illustrates a repacking operation according to some example embodiments.

Referring to FIGS. 1 and 17, the host 100 may determine whether the total number of logs corresponding to a first leaf node LN1 is more than the maximum log number. When first to third logs 71 to 73 corresponding to the first leaf node LN1 are generated, the total number of logs corresponding to the first leaf node LN1 may be 3. For example, when the maximum log number is 2, the host 100 may perform a repacking operation on the first leaf node LN1 where the total number of logs is more than the maximum log number.

The index management module 140 may generate an iterator operation including an ID C of the first leaf node LN1, and the device driver 160 may generate an iterator command based on the iterator operation and may transmit the generated iterator command to the key-value storage device 200. The key-value storage device 200 may return (e.g., provide) the first to third logs 71 to 73, including the ID C of the first leaf node LN1, to the host 100 in response to the iterator command.

The index management module 140 may select valid data from the first to third logs 71 to 73. For example, the repacking module 142b may determine a key-value entry, including a latest value of each key, as valid data, and the repacking module 142b may generate a first log 171 including the determined valid data, and the device driver 160 may generate a write command corresponding to the first log 171 so as to store the first log 171 in the key-value storage device 200 and may transmit the generated write command to the key-value storage device 200.

The key-value storage device 200 may store the first log 171 in response to the write command. For example, the first log 171 may include an updated first key-value entry 711', an updated second key-value entry 712", an updated fourth key-value entry 714, and an updated third key-value entry 713'. In some example embodiments, the key-value storage device 200 may delete all of existing first to third logs 71 to 73. Accordingly, a storage space of a key-value storage device may be efficiently adjusted.

Additionally, the index management module 140, the host controller 110, the device controller 210, the control logic and/or the components included therein may include processor(s) and/or processing circuitry such as hardware including logic circuits; a hardware/software combination such as a processor executing software; or a combination thereof. For example, the processor(s) and/or processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

Hereinabove, some example embodiments have been described in the drawings and the specification. Example embodiments have been described by using the terms described herein, but this has been merely used for describing the inventive concepts and has not been used for limiting a meaning or limiting the scope of the inventive concepts defined in the following claims. Therefore, it may be understood by those of ordinary skill in the art that various modifications and other equivalent example embodiments may be implemented from the inventive concepts. Accordingly, the spirit and scope of the inventive concepts may be defined based on the spirit and scope of the following claims.

While the inventive concepts have been particularly shown and described with reference to example embodiments thereof, it will be understood that various changes in form and details may be made therein without departing from the spirit and scope of the following claims.

What is claimed is:

1. A host communicating with a key-value storage device, the host comprising:
a host memory configured to store a tree structure including a leaf node and an index node including routing information about the leaf node; and
at least one processor configured to,
manage an index based on the tree structure,
generate a first log corresponding to the leaf node based on a first update request, the first update request corresponding to a first key-value entry included in the leaf node, the first log including a first value updated based on the first update request,
generate a first write command, the first write command corresponding to the first log, and
transmit the generated first write command to the key-value storage device so as to store the first log in the key-value storage device, wherein the at least one processor is further configured to,
generate a second log corresponding to the leaf node based on a second update request, the second update request corresponding to the first key-value entry included in the leaf node,
generate a first key of the first log so that the first key of the first log includes an identification of the leaf node as a prefix, and
generate a second key of the second log so that the second key of the second log includes the identification of the leaf node as a prefix.

2. The host of claim 1, wherein the at least one processor is further configured to:
generate a second write command corresponding to the second log; and
transmit the generated second write command to the key-value storage device so as to store the second log in the key-value storage device.

3. The host of claim 2, wherein the at least one processor is further configured to:
manage the number of logs so that the number of logs is not more than a maximum log number, the logs including the first log and the second log, each of logs corresponding to the leaf node.

4. The host of claim 3, wherein, in response to the number of logs corresponding to the leaf node is more than the maximum log number, the at least one processor is further configured to perform a repacking operation on the logs to store only valid data as a new log among the logs and delete existing logs.

5. The host of claim 1, wherein the at least one processor is further configured to:
generate an iterator operation corresponding to the identification of the leaf node so as to collect the first and second logs; and
transmit an iterator command based on the iterator operation to the key-value storage device so as to read logs including keys including the identification of the leaf node.

6. The host of claim 1, wherein the at least one processor is further configured to:
generate the first key to further include first sequence information about a sorted sequence of the first log; and
generate the second key to further include second sequence information about the sorted sequence of the second log.

7. The host of claim 6, wherein the at least one processor is further configured to:
generate a first read request corresponding to the identification and the first sequence information so as to collect the first log;
generate a second read request corresponding to the identification and the second sequence information so as to collect the second log;
generate a first read command corresponding to the first read request and transmit the generated first read command to the key-value storage device so as to read the first log from the key-value storage device;
generate a second read command corresponding to the second read request; and
transmit the generated second read command to the key-value storage device so as to read the second log from the key-value storage device.

8. The host of claim 1, wherein the at least one processor is further configured to:
manage the number of key-value entries so that the number of key-value entries included in the leaf node is not more than a maximum entry number.

9. The host of claim 8, wherein the at least one processor is further configured to:
  generate a new leaf node when the number of key-value entries included in the leaf node is more than the maximum entry number;
  generate, as a log corresponding to the new leaf node, at least one key-value entry among the key-value entries included in the leaf node;
  generate a write command corresponding to the log; and
  transmit the generated write command to the key-value storage device so as to store the log corresponding to the new leaf node in the key-value storage device.

10. The host of claim 9, wherein the at least one processor is further configured to:
  delete the at least one key-value entry from the leaf node in response to the number of key-value entries included in the leaf node is more than the maximum entry number;
  generate a write command corresponding to a deletion log representing deletion of the at least one key-value entry; and
  transmit the generated write command to the key-value storage device so as to store the deletion log in the key-value storage device.

11. The host of claim 1, wherein the at least one processor is further configured to:
  generate a second key-value entry as a third log corresponding to the leaf node based on an insertion request for the second key-value entry corresponding to the leaf node;
  generate a second write command corresponding to the third log; and
  transmit the generated second write command to the key-value storage device so as to store the third log in the key-value storage device.

12. The host of claim 1, wherein the at least one processor is further configured to:
  store the index node and the leaf node in the host memory when the index node and the leaf node are constructed;
  transmit a write request for the first log so as to store the first log in the key-value storage device when the first update request occurs;
  generate the first write command based on the write request; and
  transmit the generated first write command to the key-value storage device.

13. The host of claim 1, wherein
the at least one processor is configured to, in response to the index node and the leaf node are constructed:
  generate a second write command corresponding to the index node and the leaf node, and
  transmit the generated second write command to the key-value storage device so as to store the index node and the leaf node to the key-value storage device; and
the at least one processor is configured to, in response to the first update request occurring:
  generate the first write command corresponding to the first log, and
  transmit the generated first write command to the key-value storage device so as to store the first log in the key-value storage device.

14. The host of claim 1, wherein
the tree structure further comprises a plurality of leaf nodes; and
the at least one processor is further configured to generate keys corresponding to the plurality of leaf nodes and a first key of the first log so that the keys and the first key include a common prefix.

15. The host of claim 14, wherein the at least one processor is further configured to:
  generate the keys and the first key to further include information about a corresponding leaf node of the plurality of leaf nodes corresponding to each of the keys and the first key.

16. The host of claim 1, wherein the at least one processor is further configured to:
  generate a deletion log representing deletion of the first log based on a deletion request for the first log;
  generate a second write command corresponding to the deletion log; and
  transmit the generated second write command to the key-value storage device so as to store the deletion log in the key-value storage device.

17. A storage system comprising:
  a host; and
    a key-value storage device configured to communicate with the host, wherein
    the host comprises:
    at least one processor configured to,
  manage an index based on a tree structure, the tree structure including a plurality of leaf nodes and at least one index node including routing information about the plurality of leaf nodes,
  generate a first log corresponding to a desired leaf node of the plurality of leaf nodes based on an update request, the update request corresponding to a first key-value entry included in the desired leaf node, or generate a second log based on an insertion request for a second key-value entry, the second key-value entry corresponding to the desired leaf node,
  generate a write command, the write command corresponding to the first log or the second log, and
  transmit the generated write command to the key-value storage device so as to store the first log or the second log in the key-value storage device,
  wherein the key-value storage device is configured to store the first log or the second log in response to the write command, and
  wherein the at least one processor is further configured to generate a plurality of keys corresponding to the plurality of leaf nodes, each key of the plurality of keys including a common prefix and an identification of a corresponding leaf node of the plurality of leaf nodes.

18. The storage system of claim 17, wherein the at least one processor is further configured to:
  generate a first new key-value entry, the first new key-value entry including a value updated based on the update request, as the first log, or
  generate the second key-value entry as the second log based on the insertion request.

19. An operating method of a host configured to manage an index based on a tree structure, the tree structure including a plurality of leaf nodes and at least one index node including routing information about the plurality of leaf nodes, the operating method comprising:
  generating, using at least one processor, a first log corresponding to a desired leaf node of the plurality of leaf nodes based on a first update request, the first update request corresponding to a first key-value entry included in the desired leaf node, the generating the first log including generating a first new key-value entry, the first new key-value entry including a first value updated based on the first update request as the first log;

generating, using the at least one processor, a second key-value entry as a second log based on an insertion request, the second key-value entry corresponding to the desired leaf node;

generating, using the at least one processor, a first write command, the first write command corresponding to the first log or the second log;

transmitting, using the at least one processor, the generated first write command to a key-value storage device so as to store the first log or the second log in the key-value storage device; and generating, using the at least one processor, a plurality of keys corresponding to the plurality of leaf nodes, each of the plurality of keys including a common prefix and an identification of a corresponding leaf node of the plurality of leaf nodes.

* * * * *